(12) United States Patent
Yanagisawa

(10) Patent No.: US 10,077,201 B2
(45) Date of Patent: Sep. 18, 2018

(54) OPTICAL ELEMENT MANUFACTURING DEVICE AND OPTICAL ELEMENT SHAPING MOLD SET

(71) Applicant: OLYMPUS CORPORATION, Hachioji-shi, Tokyo (JP)

(72) Inventor: Junichi Yanagisawa, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 196 days.

(21) Appl. No.: 15/283,231

(22) Filed: Sep. 30, 2016

(65) Prior Publication Data

US 2017/0015025 A1 Jan. 19, 2017

Related U.S. Application Data

(63) Continuation of application No. PCT/JP2015/060586, filed on Apr. 3, 2015.

(30) Foreign Application Priority Data

May 27, 2014 (JP) ................................. 2014-109039

(51) Int. Cl.
| | |
|---|---|
| *C03B 11/12* | (2006.01) |
| *B29C 43/36* | (2006.01) |
| *C03B 11/08* | (2006.01) |
| *C03B 11/16* | (2006.01) |
| *B29C 43/58* | (2006.01) |
| *B29D 11/00* | (2006.01) |

(52) U.S. Cl.
CPC ............. *C03B 11/12* (2013.01); *B29C 43/36* (2013.01); *B29C 43/58* (2013.01); *C03B 11/08* (2013.01);
(Continued)

(58) Field of Classification Search
CPC ..... C03B 11/12; C03B 11/122; C03B 11/125; C03B 11/08; C03B 11/082; C03B 11/084;
(Continued)

(56) References Cited

U.S. PATENT DOCUMENTS 7,065,986 B2 * 6/2006 Meissner ................ C03B 11/08
264/1.32
2008/0230932 A1 9/2008 Tanaka
(Continued)

FOREIGN PATENT DOCUMENTS

| CN | 102119130 A | 7/2011 | |
|---|---|---|---|
| JP | 03073310 A * | 3/1991 | ........... B29C 43/003 |

(Continued)

OTHER PUBLICATIONS

Japanese Office Action dated Mar. 13, 2018 issued in counterpart Japanese Application No. 2014-109039.
(Continued)

*Primary Examiner* — Timothy Kennedy
(74) *Attorney, Agent, or Firm* — Holtz, Holtz & Volek PC

(57) ABSTRACT

An optical element manufacturing device includes a mold set including: a first shaping mold and a second shaping mold facing each other with a shaping-target material between the first and second shaping molds, and a sleeve located around the first and second shaping molds; and a plurality of stages on which the mold set is conveyed and which heat, press or cool the shaping-target material. The sleeve is conveyed to the stages in such a manner that a conveyance-direction front side of the mold set in an arrangement direction of the plurality of stages has a heat insulation portion with a heat insulation property that is higher than that on a conveyance-direction rear side of the mold set in order to reduce a temperature distribution in the shaping-target material.

12 Claims, 26 Drawing Sheets

(52) U.S. Cl.
CPC ............ *C03B 11/125* (2013.01); *C03B 11/16* (2013.01); *B29C 2043/3628* (2013.01); *B29C 2043/5816* (2013.01); *B29D 11/0048* (2013.01); *B29D 11/00951* (2013.01); *C03B 2215/03* (2013.01); *C03B 2215/50* (2013.01); *C03B 2215/66* (2013.01); *C03B 2215/72* (2013.01); *C03B 2215/86* (2013.01)

(58) Field of Classification Search
CPC ................ C03B 11/086; C03B 11/088; B29C 2043/3628; B29C 2043/5816
See application file for complete search history.

(56) References Cited

U.S. PATENT DOCUMENTS

| | | | |
|---|---|---|---|
| 2011/0135865 | A1 | 6/2011 | Ueno et al. |
| 2012/0248638 | A1* | 10/2012 | Matsuda ................ B29C 33/38 264/2.5 |

FOREIGN PATENT DOCUMENTS

| | | | | |
|---|---|---|---|---|
| JP | 2000007356 | A | | 1/2000 |
| JP | 2000247653 | A | | 9/2000 |
| JP | 2007238345 | A * | 9/2007 | ............ C03B 11/08 |
| JP | 2009215140 | A | | 9/2009 |
| JP | 2009234883 | A | | 10/2009 |
| JP | 2010159182 | A | | 7/2010 |
| JP | 2012116705 | A | | 6/2012 |
| WO | 2007063911 | A1 | | 6/2007 |
| WO | 2010055763 | A1 | | 5/2010 |

OTHER PUBLICATIONS

International Search Report (ISR) dated Jul. 7, 2015 issued in International Application No. PCT/JP2015/060586.
Chinese Office Action dated Feb. 24, 2018 issued in counterpart Chinese Application No. 201580018949.7.

* cited by examiner

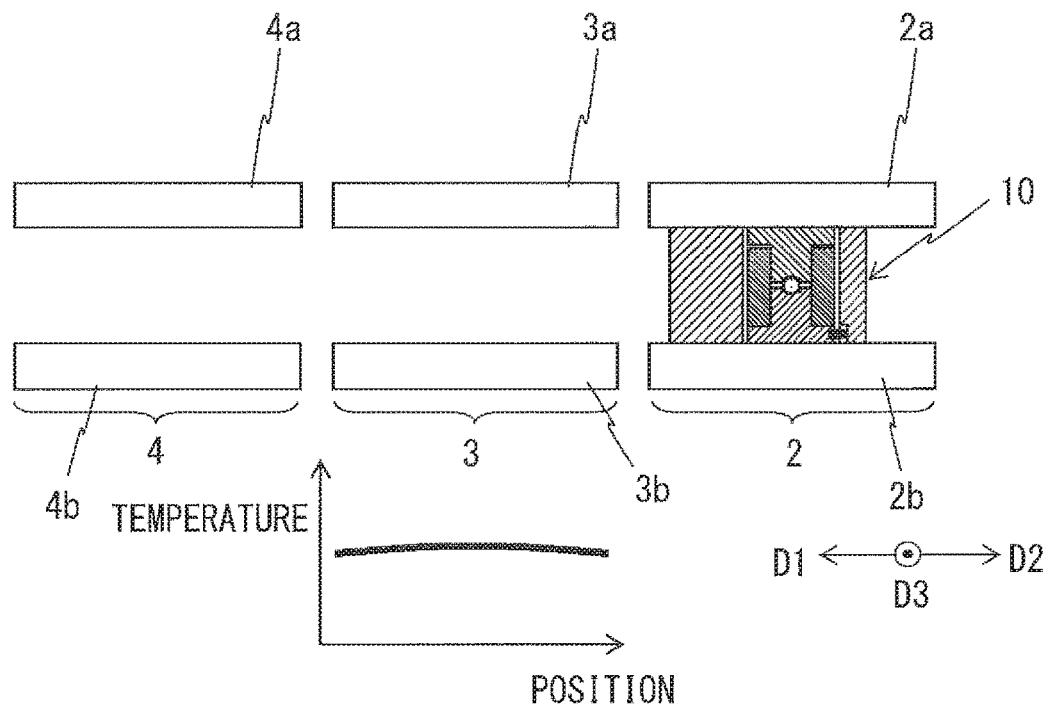
F I G. 4 A

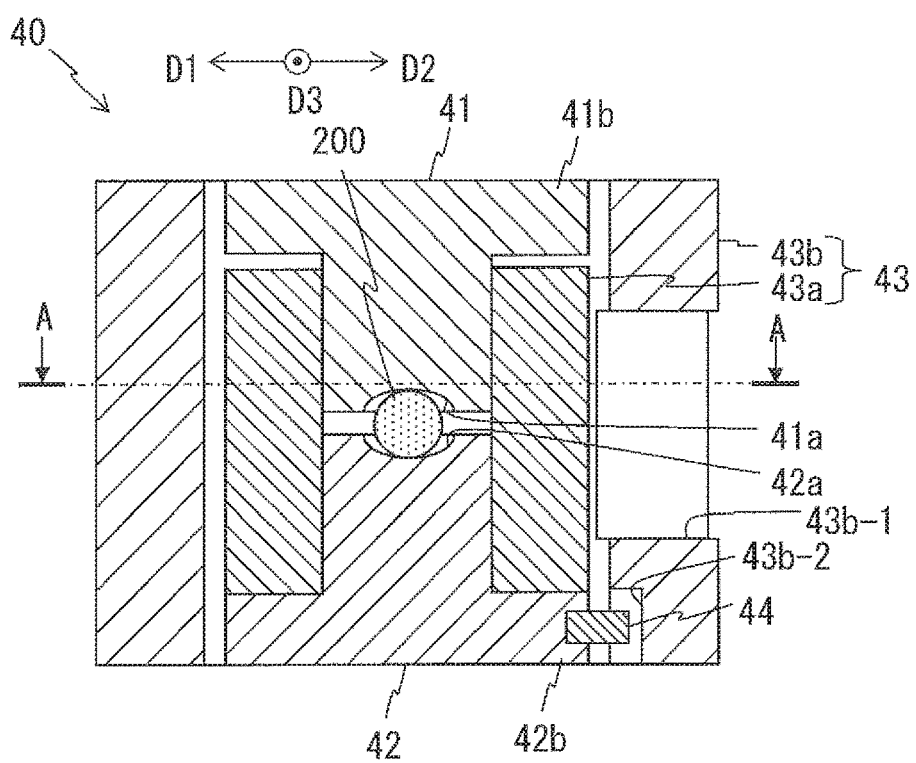
F I G. 9 A

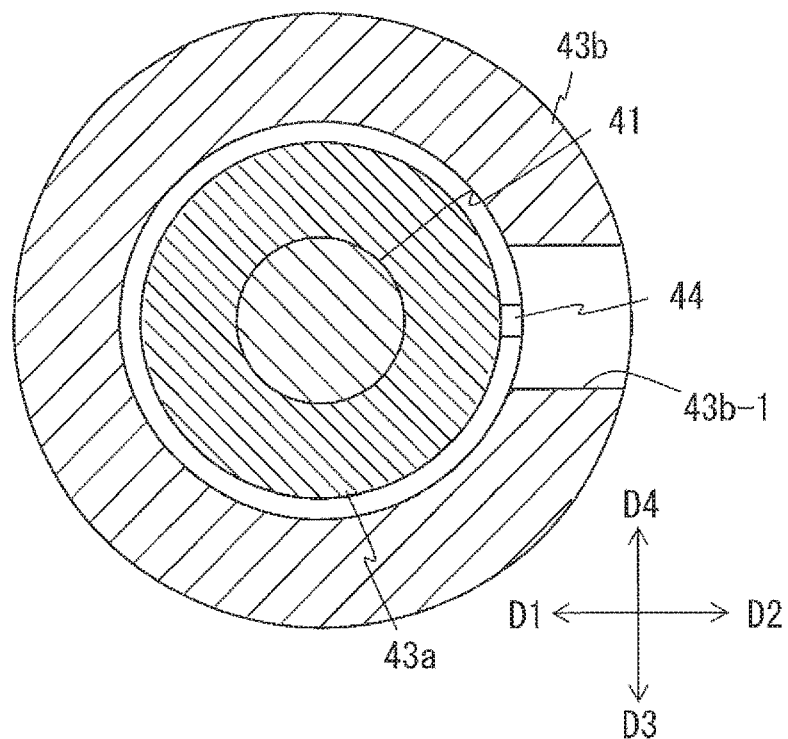
F I G. 9 C

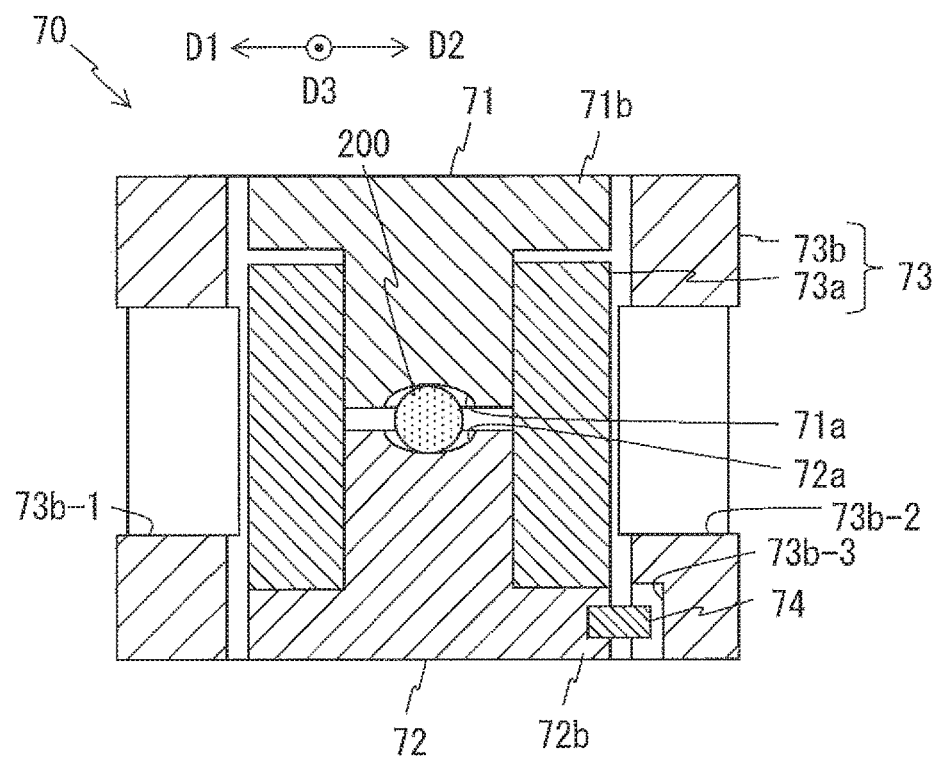
F I G. 1 2 A

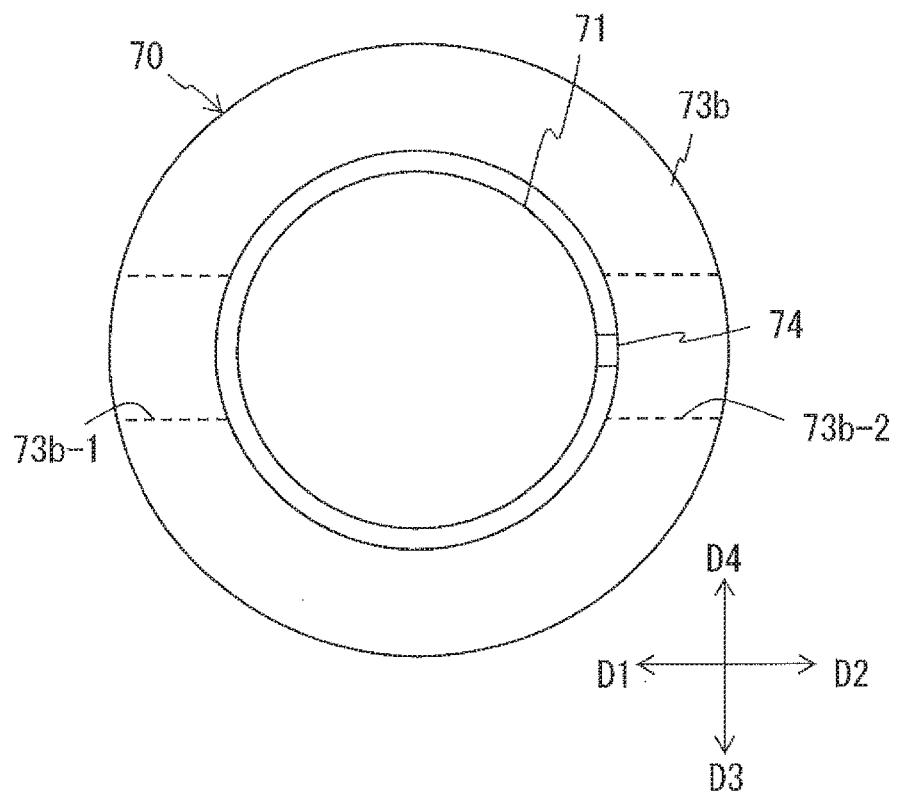
F I G. 1 2 B

OPTICAL ELEMENT MANUFACTURING DEVICE AND OPTICAL ELEMENT SHAPING MOLD SET

CROSS REFERENCE TO RELATED APPLICATIONS

This is Continuation Application of PCT application No. PCT/JP/2015/060586, filed Apr. 3, 2015, which was not published under PCT Article 21(2) in English.

This application is based upon and claims the benefit of priority from the prior Japanese Patent Application No. 2014-109039, filed May 27, 2014, the entire contents of which are incorporated herein by reference.

BACKGROUND OF THE INVENTION

Field of the Invention

The present invention relates to an optical element manufacturing device for manufacturing an optical element and to an optical element shaping mold set used for manufacturing an optical element.

Description of the Related Art

As a conventional technique, an optical element manufacturing method is known in which a shaping-target material accommodated in a mold set is conveyed sequentially to respective stages for heating, pressing and cooling so as to manufacture a desired optical element. On the above stage, a pair of plate-shaped or block-shaped temperature adjustment members are arranged, the temperature adjustment members facing each other with a mold set between them. Also, a mold set has for example an upper mold, a lower mold, a sleeve, etc. A sleeve is a tubular member located around the upper and lower molds.

Regarding the above manufacturing method of an optical element, a technique of arranging heat insulation units at ends of the temperature adjustment members in order to soak the surfaces of the temperature adjustment members (for example Japanese Laid-open Patent Publication No. 2010-159182) and a technique of making a plurality of cartridge heaters have different temperatures (for example Japanese Laid-open Patent Publication No. 2012-116705) are known.

SUMMARY OF THE INVENTION

According to an aspect, an optical element manufacturing device is an optical element manufacturing device including: a mold set including a first shaping mold and a second shaping mold facing each other with a shaping-target material between the first and second shaping molds, and a sleeve located around the first and second shaping molds; and a plurality of stages on which the mold set is conveyed and which heat, press or cool the shaping-target material, wherein the sleeve is conveyed to the stages in such a manner that a conveyance-direction front side of the mold set in an arrangement direction of the plurality of stages has a heat insulation portion with a heat insulation property that is higher than that on a conveyance-direction rear side of the mold set in order to reduce a temperature distribution in the shaping-target material.

According to another aspect, an optical element manufacturing device is an optical element manufacturing device including: a mold set including a first shaping mold and a second shaping mold facing each other with a shaping-target material between the first and second shaping molds, and a sleeve located around the first and second shaping molds; and a plurality of stages on which the mold set is conveyed and which heat, press or cool the shaping-target material, wherein the sleeve is conveyed to the stages in such a manner that at least one of horizontal directions, which are orthogonal to arrangement directions of the plurality of stages, has a heat insulation portion with a heat insulation property that is higher than that on a conveyance-direction rear side of the mold set in the arrangement directions in order to reduce a temperature distribution in the shaping-target material.

According to another aspect, an optical element manufacturing device is an optical element manufacturing device including: a mold set including a first shaping mold and a second shaping mold facing each other with a shaping-target material between the first and second shaping molds, and a sleeve located around the first and second shaping molds; and a shaping chamber in which a gas intake is formed through which a substitution gas flows into the shaping chamber, wherein the sleeve is conveyed to the stages in such a manner that a side of the gas intake in circumferential directions of the sleeve has a heat insulation portion with a heat insulation property that is higher than a side of at least part of other portions in order to reduce a temperature distribution in the shaping-target material.

According to an aspect, an optical element shaping mold set includes: a first shaping mold and a second shaping mold facing each other with a shaping-target material between the first and second shaping molds; and a sleeve located around the first and second shaping molds, and the sleeve has a heat insulation portion with a heat insulation property that is higher than that of at least part of other portions in circumferential directions of the sleeve in order to reduce a temperature distribution in the shaping-target material.

BRIEF DESCRIPTION OF THE DRAWINGS

FIG. 4A is a first view that explains a temperature distribution in a shaping-target material according to the first embodiment (with plate temperature control);

FIG. 9A is a sectional view showing a mold set according to a fourth embodiment of the present invention;

FIG. 9C is a sectional view along line A-A of FIG. 9A;

FIG. 12A is a sectional view showing a mold set according to a seventh embodiment of the present invention;

FIG. 12B is a plan view showing a mold set according to the seventh embodiment of the present invention;

DETAILED DESCRIPTION OF INVENTION

Figure 1:
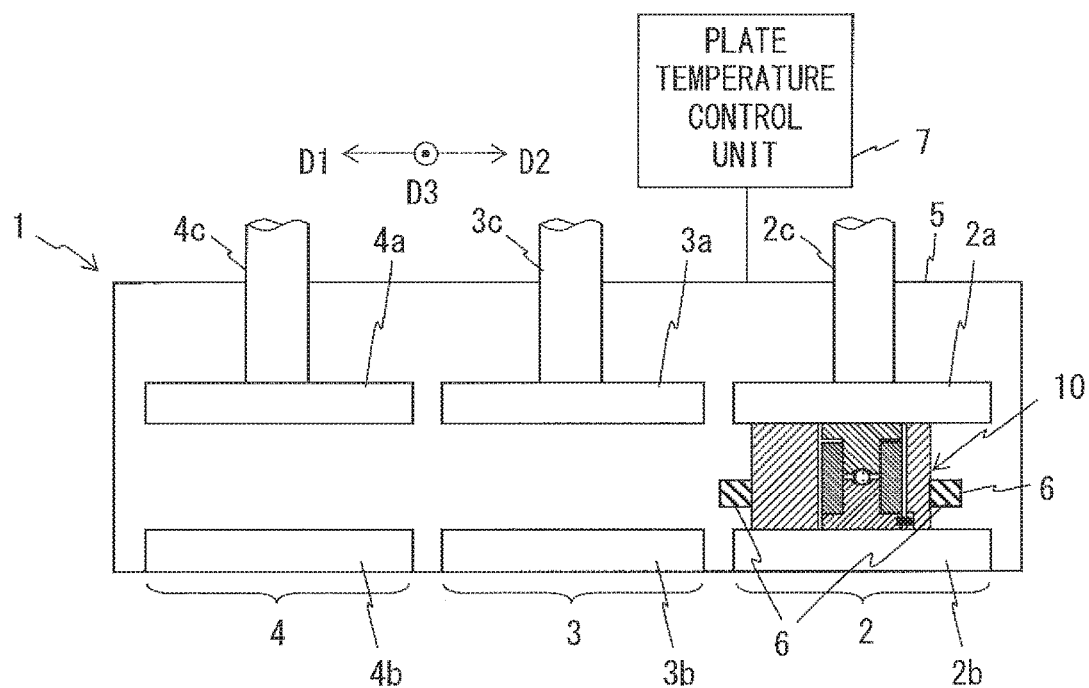
FIG. 1 is a front view showing an internal structure of an optical element manufacturing device according to a first embodiment of the present invention.

The above respective stages have different temperatures, resulting in a situation in which temperatures in neighboring stages cause distributions of ambient temperatures around the mold sets. Also, no stages exist in the horizontal direction side, which is orthogonal to the directions in which the stages are arranged, leading to distributions in which the ambient temperatures are low. These distributions of ambient temperatures are difficult to cancel even by adjusting the temperatures of the stages themselves through complicated control, leading to temperature distributions in the shaping-target materials accommodated in the mold sets. As described above, temperature distributions caused in shaping-target materials deteriorate the shaping accuracy of the optical element to be manufactured.

Hereinafter, explanations will be given for optical element manufacturing devices and optical element shaping mold sets according to the embodiments of the present invention by referring to the drawings.

First Embodiment

FIG. 1 is a sectional view showing an internal structure of an optical element manufacturing device 1 according to a first embodiment of the present invention.

The optical element manufacturing device 1 shown in FIG. 1 includes a first stage 2, a second stage 3, a third stage 4, a shaping chamber 5, a conveyance robot 6 and a plate temperature control unit 7.

The first stage 2, the second stage 3 and the third stage 4 are examples of a plurality of stages on which optical element shaping mold sets (referred to as "mold sets" hereinafter) 10 are conveyed so that shaping-target materials 200 are heated, pressed or cooled.

Also, the plate temperature control unit 7 is an example of a temperature control unit that controls the temperatures of upper plates 2a through 4a and lower plates 2b through 4b that are an example of a temperature adjustment member and that will be described later.

The first through third stages 2 through 3 respectively have the upper plates 2a through 4a and lower plates 2b through 4b that are paired and that face each other with the mold sets 10 between them.

For example, the first stage 2 is a heating stage that heats and softens the shaping-target material 200, the second stage 3 is a pressing stage that presses the shaping-target material 200 so as to shape it, and the third stage 4 is a cooling stage that cools the shaping-target material 200. Alternatively, for example, the first stage 2 functions both as the heating stage for heating and softening the shaping-target material 200 and as the pressing stage for pressing and shaping the shaping-target material 200, and the second stage 3 is a first cooling stage for cooling the shaping-target material 200, and the third stage 4 is a second cooling stage for cooling the shaping-target material 200. However, the functions of the stages 2 through 4 are just exemplary. Also, an arbitrary number greater than one of the stages may be used.

The upper plates 2a through 4a are connected to cylinders 2c through 4c, and are moved horizontally by being driven by the cylinders 2c through 4c. The lower plates 2b through 4b are fixed to the bottom surface of the shaping chamber 5 via for example a heat insulation member (not shown). The upper plates 2a through 4a and the lower plates 2b through 4b directly abut the mold sets 10, while a different member such as a soaking member etc. may be placed on the portions abutting the mold sets 10.

In the shaping chamber 5, an inert gas (such as an Ar gas) or a Nitrogen gas (such as $N_2$) are substituted or the space in the shaping chamber 5 is at atmospheric pressure.

In the shaping chamber 5, the conveyance robot 6 conveys the mold set 10 to the first stage 2, the second stage 3 and the third stage 4 in this order (arrow D1) while holding the mold set 10 in for example a sandwiching manner. It is desired that the conveyance robot 6 convey the mold set 10 without changing the direction of turning of the mold set 10. For this, it is desired that for example the portion of the conveyance robot 6 abutting the mold set 10 be engaged with the outer periphery of the mold set 10.

The plate temperature control unit 7 controls the temperatures of the upper plates 2a through 4a and the lower plates 2b through 4b.

Figure 2A:
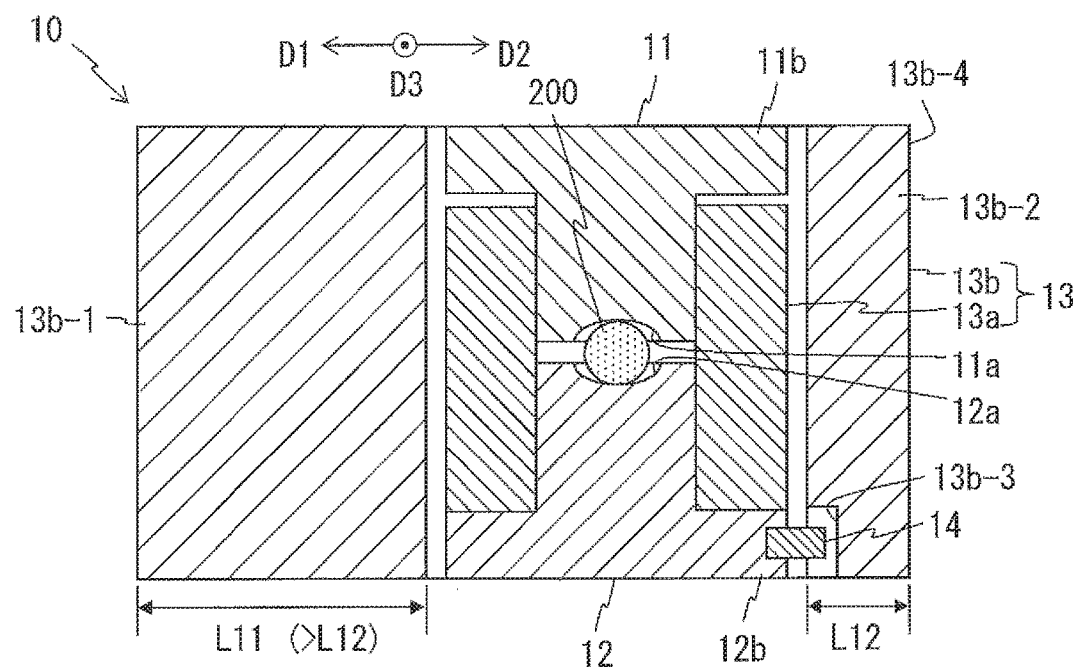
FIG. 2A is a sectional view showing a mold set according to the first embodiment of the present invention.
Figure 2B:
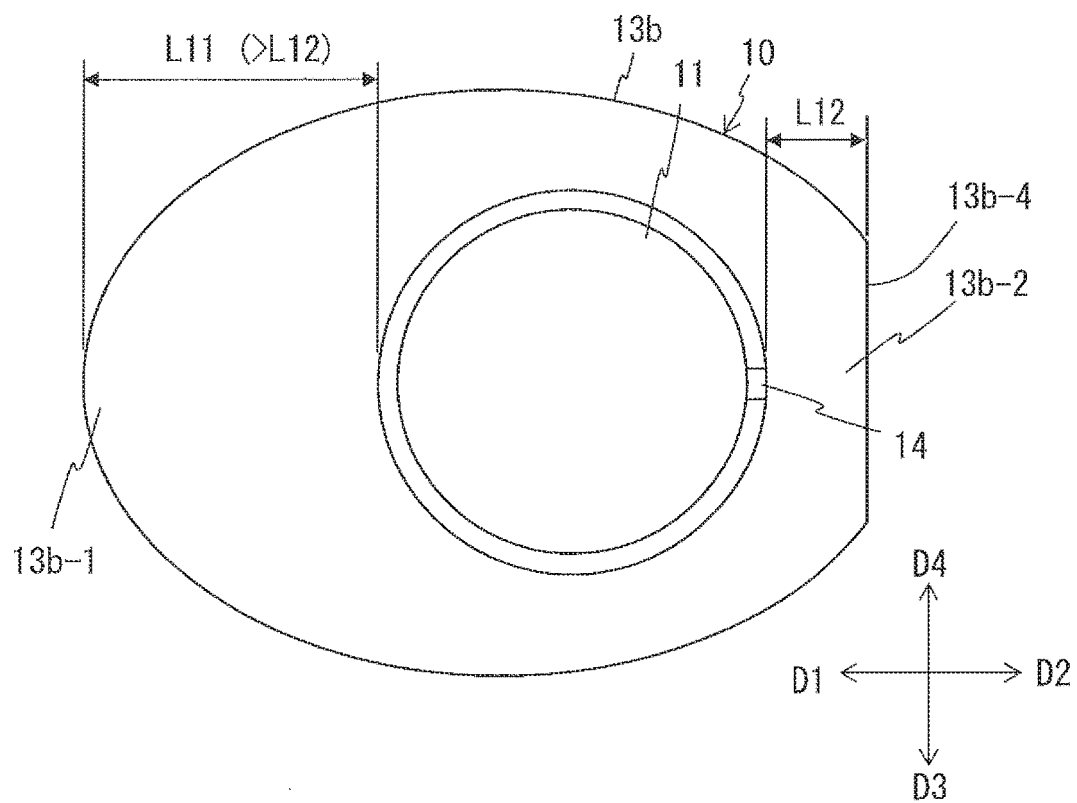
FIG. 2B is a plan view of a mold set according to the first embodiment of the present invention.

FIG. 2A and FIG. 2B are a sectional view and a plan view of the mold set 10 according to the first embodiment.

As shown in FIG. 2A, the mold set 10 has an upper mold 11 and a lower mold 12, which are examples of first and second shaping molds that face each other with the shaping-target material 200 between them, a sleeve 13 located around the upper mold 11 and the lower mold 12, and a pin 14, which is an example of a turning prevention member.

The upper mold 11 and the lower mold 12 is in for example a substantially cylindrical shape. On the bottom surface of the upper mold 11, a shaping surface 11a in for example a concave shape is formed. Also, on the upper surface of the lower mold 12, a shaping surface 12a in for example a concave shape is formed. At the upper end of the upper mold 11 and the lower end of the lower mold 12, flanges 11b and 12b are formed.

The sleeve 13 has a sleeve main body 13a and an outer layer portion 13b. The sleeve main body 13a is in for example a tubular shape, and is arranged between the flange 11b of the upper mold 11 and the flange 12b of the lower mold 12. On the inner surface of the sleeve main body 13*a*, the outer surfaces of the upper mold 11 and the lower mold 12 can slide. The outer layer portion 13*b* is arranged around the sleeve main body 13*a* and has a space between itself and for example the sleeve main body 13*a*. As will be explained later in detail, the sleeve 13 is moved to the stages 2, 3 and 4 so that the conveyance-direction front side (arrow D1) of the mold set 10 in the arrangement directions (arrows D1 and D2) of the plurality of stages 2 through 4 has a heat insulation portion (thick portion 13*b*-1) with a heat insulation property that is higher than that on the conveyance-direction rear side (arrow D2) of the mold set 10 in order to reduce the temperature distribution in the shaping-target material 200.

The pin 14 is provided in such a manner that it projects from the outer periphery of the flange 12*b* so as to prevent the turning of the outer layer portion 13*b* in the mold set 10, and is inserted into a pin-receiving concave portion 13*b*-3 formed on the inner surface of the outer layer portion 13*b*.

As shown in FIG. 2B, the outer layer portion 13*b* has a substantially elliptic-cylindrical shape that is long in the arrangement directions of the stages (arrows D1 and D2) seen as a planar view. However, on the conveyance-direction rear side (arrow D2) of the mold set 10, a flat portion 13*b*-4 is formed that expands in the horizontal directions (arrows D3 and D4), which are orthogonal to the arrangement directions (arrows D1 and D2), and in the vertical directions.

Also, while the conveyance-direction front side (arrow D1) of the mold set 10 is the thick portion 13*b*-1 (thickness is L11), the conveyance-direction rear side (arrow D2) is a thin portion 13*b*-2 (thickness is L12 (<L11)). Thereby, the thick portion 13*b*-1 has a heat insulation property that is higher than that of the thin portion 13*b*-2 so as to function as an example of a heat insulation portion. This heat insulation portion can be considered to be a portion with a heat insulation property that is higher than at least part of other portions in the circumferential directions of the sleeve 13.

Note that the outer layer portion 13*b* has a thickness that gradually increases with decreasing distances to the conveyance-direction front side (arrow D1) of the mold set 10 from the above horizontal directions (arrows D3 and D4).

The heat insulation portion may be formed on the sleeve main body 13*a* instead of the outer layer portion 13*b*, and this applies also to the following respective embodiments. When the heat insulation portion is formed on the sleeve main body 13*a* in the first embodiment, the thick portion 13*b*-1 and the thin portion 13*b*-2 are formed on the sleeve main body 13*a* instead of the outer layer portion 13*b*. In such a case, the outer layer portion 13*b* may be omitted.

As the heat insulation portion, a portion made of a material different from that of the sleeve 13 may be used, and this applies to the following respective embodiments. It is also possible for example to use different materials for the heat insulation portion and the other portions so as to use the material with the higher heat insulation property as the heat insulation portion. Alternatively, it is also possible to provide a member (such as a sheet) having a heat insulation property on the outer or inner periphery of the outer layer portion 13*b* or the sleeve main body 13*a* as a heat insulation portion, and it is also possible to provide a member (such as a sheet) having a heat dispersion property in a portion other than the heat insulation portion. Alternatively, it is also possible to color a heat insulation portion with a bright color while coloring the other portions with a dark color so as to make the heat insulation portion less easy to cool than the other portions in order to increase the heat insulation property.

Figure 3A:
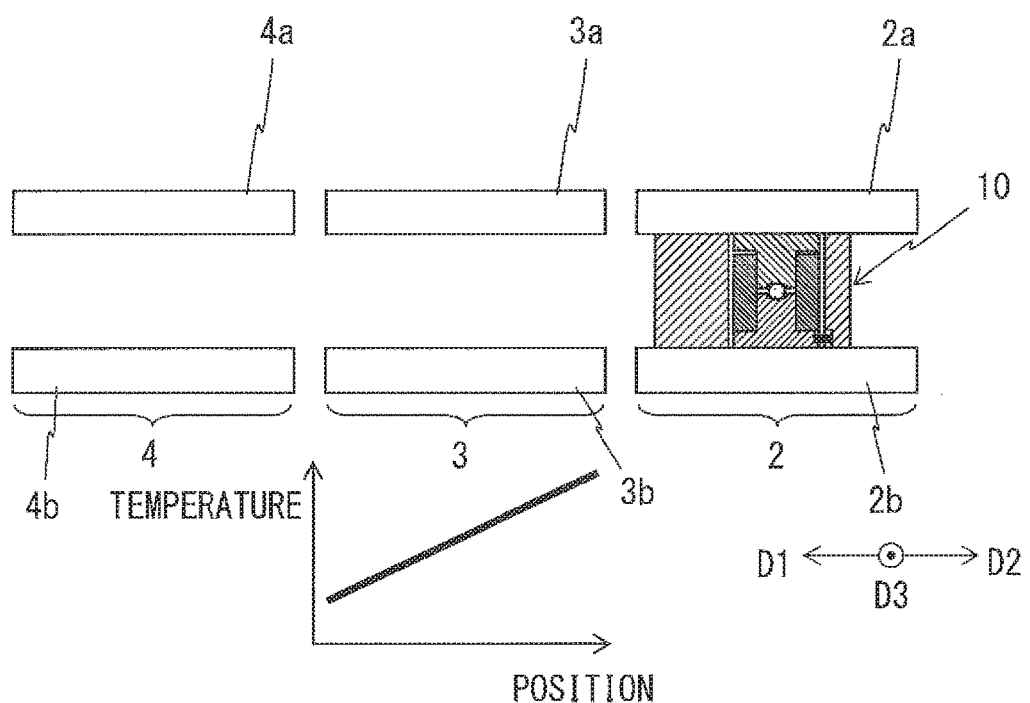
FIG. 3A is a first view that explains a temperature distribution in a shaping-target material according to the first embodiment (without plate temperature control)
Figure 3B:
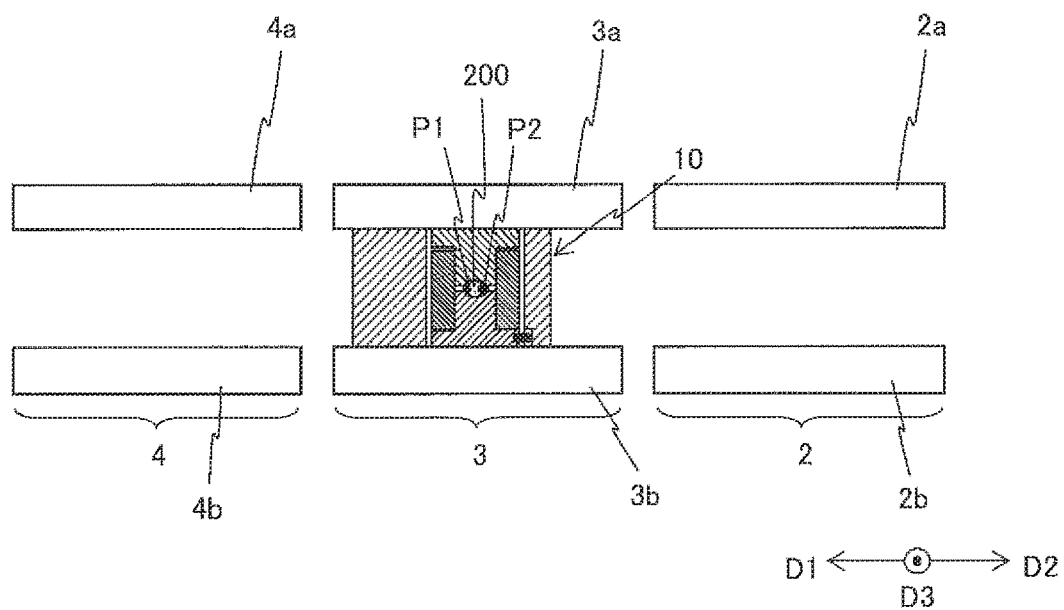
FIG. 3B is a second view that explains a temperature distribution in a shaping-target material according to the first embodiment (without plate temperature control)
Figure 3C:
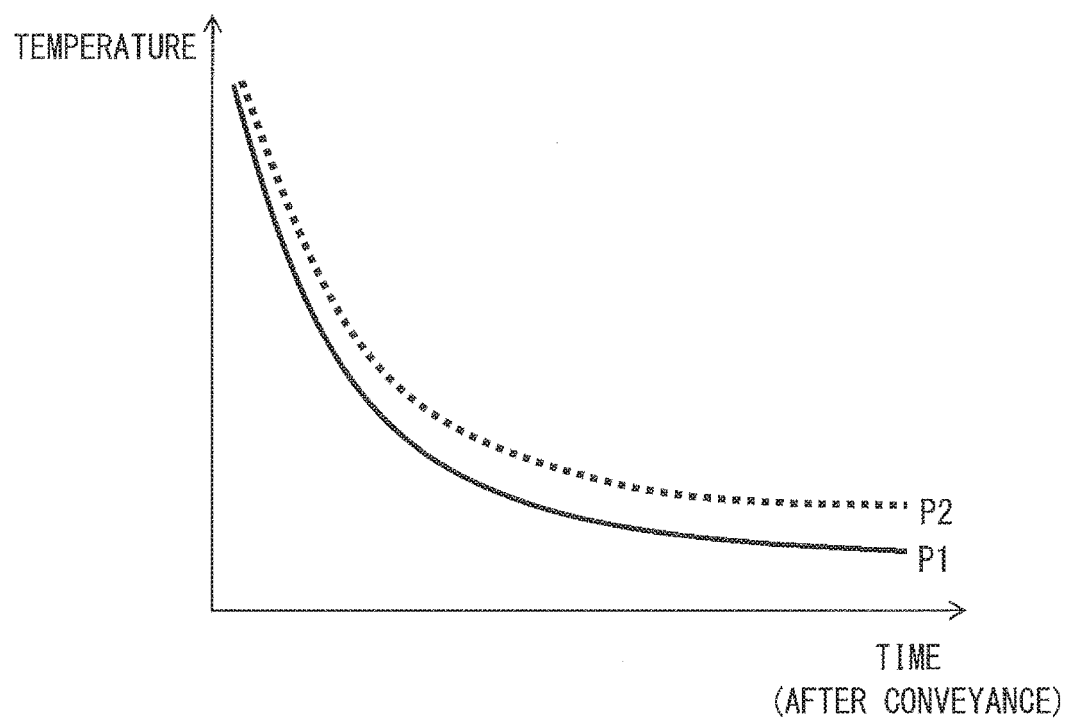
FIG. 3C is a third view that explains a temperature distribution in a shaping-target material according to the first embodiment (without plate temperature control)

FIG. 3A through FIG. 3C explain the temperature distribution in the shaping-target material 200 according to the first embodiment (without plate temperature control).

As shown in FIG. 3A, the surface temperatures of the upper plate 3*a* and the lower plate 3*b* of the second stage 3 gradually become lower with reduced distances to the third stage 4 side, which is on the lower temperature side, from the first stage 2 side, which is the higher temperature side, because the temperature distribution is not made uniform by the plate temperature control unit 7.

However, the outer layer portion 13*b* of the sleeve 13 is provided with the thick portion 13*b*-1 and the thin portion 13*b*-2 as described above. This results in a situation where the temperatures at ends P1 and P2 of the shaping-target material 200 accommodated in the mold set 10 that has been conveyed to the second stage 3 as shown in FIG. 3B are not so different from each other, as shown in FIG. 3C, even after the mold set 10 has been conveyed to the second stage 3. Note that results similar to this result are achieved also for the first stage 2 and the third stage 4.

Figure 4B:
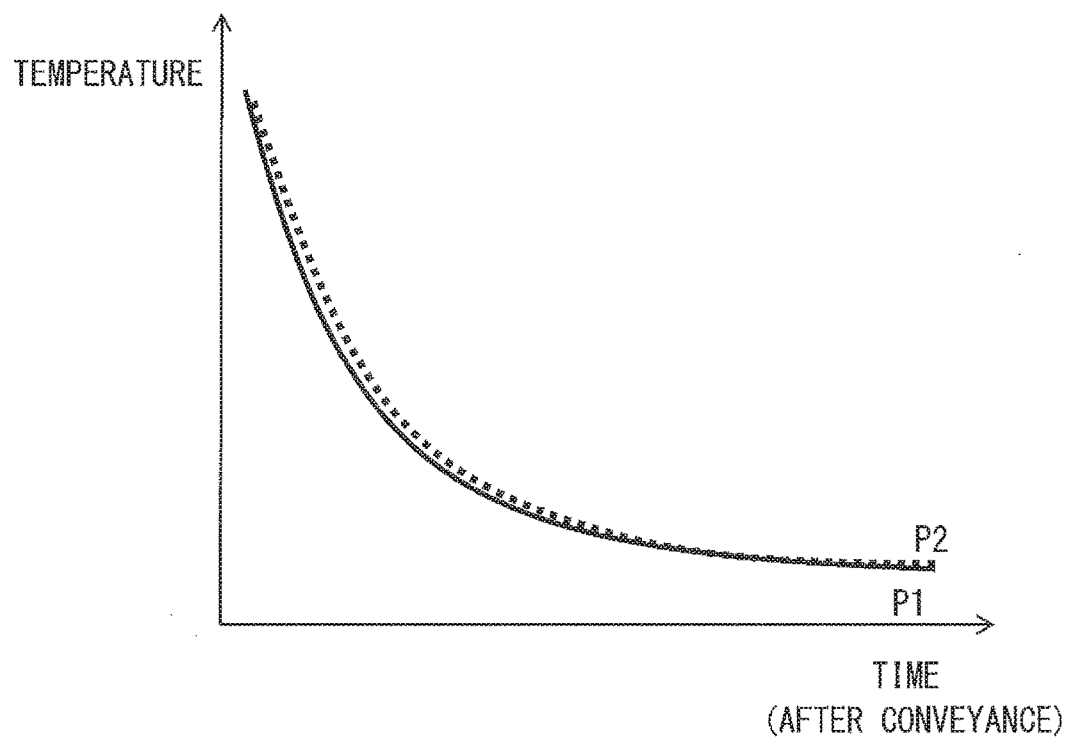
FIG. 4B is a second view that explains a temperature distribution in a shaping-target material according to the first embodiment (with plate temperature control)

FIG. 4A and FIG. 4B explain the temperature distribution in the shaping-target material 200 according to the first embodiment (with plate temperature control).

As shown in FIG. 4A, the upper plate 3*a* and the lower plate 3*b* of the second stage 3 do not have different surface temperatures between the third stage 4 side, which is the lower temperature side, and the first stage 2 side, which is the higher temperature side, because the temperature distribution has been made uniform by the plate temperature control unit 7.

Also, the outer layer portion 13*b* is provided with the thick portion 13*b*-1 and the thin portion 13*b*-2 as described above. The temperatures at ends P1 and P2 of the shaping-target material 200 accommodated in the mold set 10 that has been conveyed to the second stage 3 as shown in FIG. 3B have a difference smaller than that shown in FIG. 3C as shown in FIG. 4B after the mold set 10 has been conveyed to the second stage 3. Note that results similar to this result are achieved also for the first stage 2 and the third stage 4.

Figure 5A:
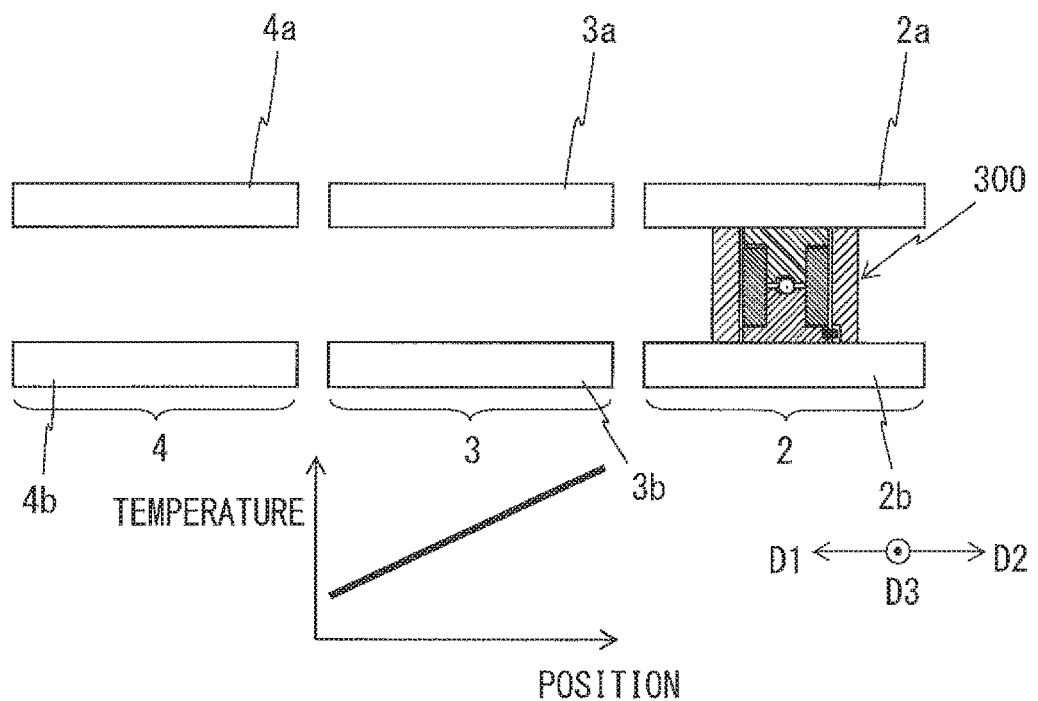
FIG. 5A is a first view that explains a temperature distribution in a shaping-target material according to a comparison example (without plate temperature control)
Figure 5B:
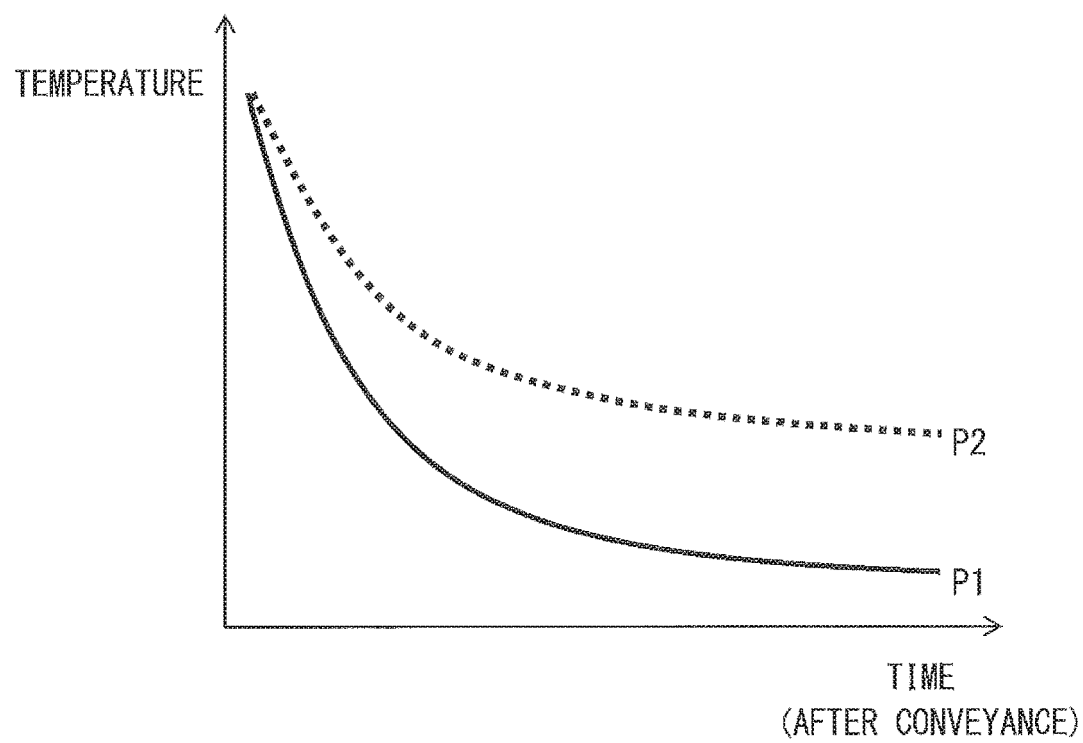
FIG. 5B is a second view that explains a temperature distribution in a shaping-target material according to the comparison example (without plate temperature control)

FIG. 5A and FIG. 5B explain the temperature distribution in the shaping-target material 200 in a comparison example (without plate temperature control).

As shown in FIG. 5A, the surface temperatures of the upper plate 3*a* and the lower plate 3*b* of the second stage 3 gradually become lower with decreasing distances to the third stage 4 side, which is the lower temperature side, from the first stage 2 side, which is the higher temperature side, because the temperature distribution has not been made uniform by the plate temperature control unit 7.

Also, a mold set 300 in the comparison example is not provided with the thick portion 13*b*-1 or the thin portion 13*b*-2, differently from the outer layer portion 13*b* of the present embodiment. Accordingly, the shaping-target material 200 is influenced by the temperature of the second stage 3 and the ambient temperature, resulting in a greater difference between the temperatures of ends P1 and P2 of the shaping-target material 200 accommodated in the mold set 300 that has been conveyed to the second stage 3 after the mold set 300 has been conveyed to the second stage 3.

Figure 6A:
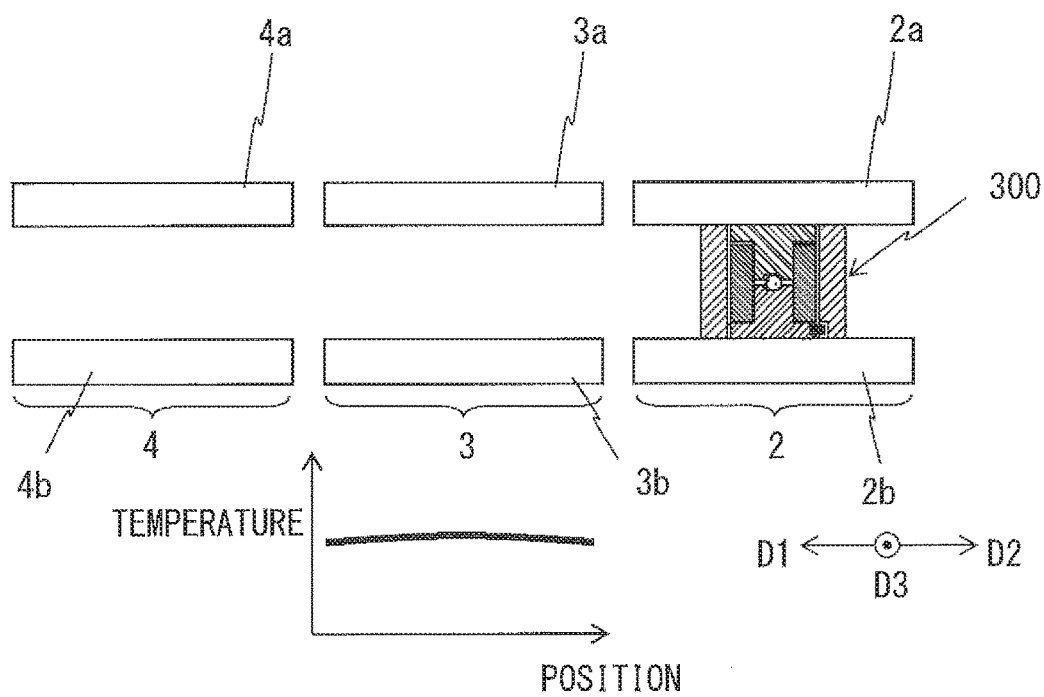
FIG. 6A is a first view that explains a temperature distribution in a shaping-target material according to the comparison example (with plate temperature control)
Figure 6B:
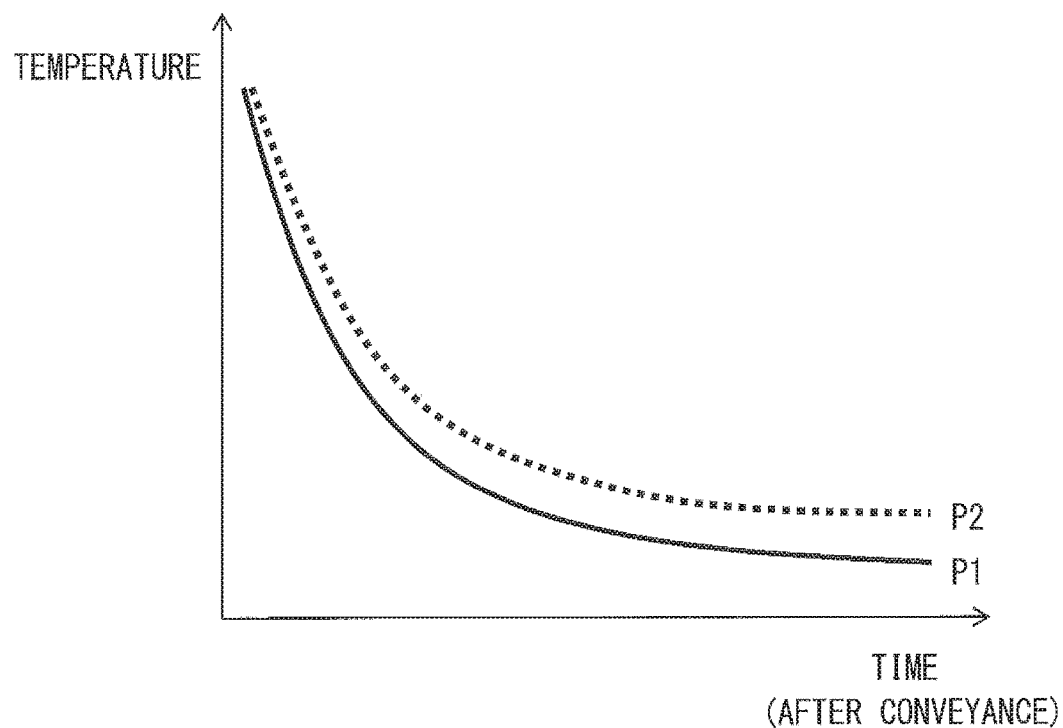
FIG. 6B is a second view that explains a temperature distribution in a shaping-target material according to the comparison example (with plate temperature control)

FIG. 6A and FIG. 6B explain the temperature distribution in the shaping-target material 200 according to the comparison example (with plate temperature control).

As shown in FIG. 6A, the upper plate 3*a* and the lower plate 3*b* of the second stage 3 do not have different surface temperatures between the third stage 4 side, which is the lower temperature side, and the first stage 2 side, which is the higher temperature side, because the temperature distribution has been made uniform by the plate temperature control unit 7.

Also, in the mold set 300 in the comparison example, the thick portion 13b-1 or the thin portion 13b-2 are not provided differently from the outer layer portion 13b of the present embodiment. Accordingly, the shaping-target material 200 is influenced by the ambient temperature, resulting in a difference, as shown in FIG. 6B after the mold set 300 has been conveyed to the second stage 3, between the temperatures of ends P1 and P2 of the shaping-target material 200 accommodated in the mold set 300 that has been conveyed to the second stage 3 in spite of the control of the plate temperatures, although this is not so great as that shown FIG. 5B.

Hereinafter, explanations will be given for an optical element manufacturing method according to the first embodiment by referring to FIG. 1 and FIG. 2A.

First, explanations will be given for the heating step, in which the shaping-target material 200 is heated and softened.

The mold set 10 is moved onto the lower plate 2b of the first stage 2 by the conveyance robot 6 shown in FIG. 1 or a conveyance robot for conveying the mold set 10 in and out of the shaping chamber 5. In the above situation, it is desirable for the outer layer portion 13b that the thick portion 13b-1 be located on the conveyance-direction front side (arrow D1) of the mold set 10. This is because the conveyance-direction front side (arrow D1) is easily influenced by temperature changes (mainly, temperature reductions). It is desirable for the outer layer portion 13b that the thick portion 13b-1 be located on the conveyance-direction front side (arrow D1) of the mold set 10 on the second stage 3 and the third stage 4 as well.

Then, the upper plate 2a of the first stage 2 descends by being driven by the cylinder 2c and the mold set 10 is heated through thermal conduction etc. from the upper plate 2a and the lower plate 2b, and thereby the shaping-target material 200 is heated and softened. The temperatures of the upper plate 2a and the lower plate 2b receive the above control shown in for example FIG. 4 by the plate temperature control unit 7. This applies to the upper plates 3a and 4a and the lower plates 3b and 4b of the second stage 3 and the third stage 4, which will be described later.

Next, explanations will be given for the pressing step in which the shaping-target material 200 is pressed and shaped.

The pressing step is performed for the first stage 2 or the second stage 3. When the pressing step is performed for the first stage 2, the cylinder 2c further descends with the shaping-target material 200 in a heated/softened state, and thereby the shaping-target material 200 is pressed into a prescribed shape. When the pressing step is performed for the second stage 3, the mold set 10 is conveyed onto the lower plate 3b of the second stage 3 by the conveyance robot 6 and the upper plate 3a of the second stage 3 descends by being driven by the cylinder 3c so that the shaping-target material 200 is pressed.

Next, explanations will be given for the cooling step, in which the shaping-target material 200 is cooled.

The cooling step is performed for both the second stage 3 and the third stage 4 or only for the third stage 4. When the cooling step is performed for both the second stage 3 and the third stage 4, the mold set 10 is conveyed onto the lower plate 3b of the second stage 3 by the conveyance robot 6, the upper plate 3a of the second stage 3 descends by being driven by the cylinder 3c, and the mold set 10 is cooled through thermal conduction etc. to the upper plate 3a and the lower plate 3b. Then, the mold set 10 is conveyed onto the lower plate 4b of the third stage 4 by the conveyance robot 6, the upper plate 4a of the third stage 4 descends by being driven by the cylinder 4c, and the mold set 10 is further cooled through thermal conduction etc. to the upper plate 4a and the lower plate 4b.

When the cooling step is performed only for the third stage 4, the mold set 10 having the shaping-target material 200 pressed on the second stage 3 is conveyed onto the lower plate 4b of the third stage 4 by the conveyance robot 6, the upper plate 4a of the third stage 4 descends by being driven by the cylinder 4c, and the mold set 10 is cooled through thermal conduction to the upper plate 4a and the lower plate 4b.

Thereafter, the mold set 10 is conveyed out of the shaping chamber 5 by the conveyance robot 6 or the above conveyance robot, and the manufactured optical element is taken out from the mold set 10.

According to the first embodiment described above, the mold set 10 has the upper mold 11 (an example of the first shaping mold) and the lower mold 12 (an example of the second shaping mold) facing each other with the shaping-target material 200 between them, and the sleeve 13 located around the upper mold 11 and the lower mold 12. On the plurality of stages 2 through 4, the mold set 10 is conveyed so that the shaping-target material 100 is heated, pressed or cooled. The sleeve 13 is conveyed to the stages 2, 3 and 4 so that the conveyance-direction front side (arrow D1) of the mold set 10 in the arrangement directions (arrows D1 and D2) of the plurality of stages 2 through 4 has a thick portion (an example of a heat insulation portion) 13b-1 with a heat insulation property that is higher than that on the conveyance-direction rear side (arrow D2) of the mold set 10 in order to reduce the temperature distribution in the shaping-target material 200.

Accordingly, even when a distribution is caused, by the temperatures of the plurality of neighboring stages 2 through 4, in the ambient temperature around the mold set 10, an influence of a reduction in the temperature of the shaping-target material 200 on the conveyance-direction front side (arrow D1), which is influenced by temperature changes (mainly reductions in temperatures) more easily, can be suppressed by using a simple configuration including the thick portion 13b-1, which is an example of the heat insulation portion, or the thin portion 13b-2 with a heat insulation property lower than that of the thick portion 13b-1. This can increase the accuracy of manufactured optical elements.

Thus, according to the first embodiment, highly accurate optical elements are manufactured with suppressed temperature distributions in the shaping-target materials 200 by using a simple configuration.

Also, according to the first embodiment, the sleeve 13 has the sleeve main body 13a and the outer layer portion 13b on a portion further out than this sleeve main body 13a, and the thick portion 13b-1, which is an example of a heat insulation portion, is formed on the outer layer portion 13b. This makes it possible to suppress temperature distributions in the shaping-target materials 200 by using a simple technique of processing the outer layer portion 13b that is arranged in addition to the sleeve main body 13a.

Also, according to the first embodiment, the mold set 10 further includes the pin (an example of a turning prevention member) 14 that prevents the outer layer portion 13b from turning in the mold set 10. This makes it possible to prevent the thick portion 13b-1, which is an example of the heat insulation portion of the outer layer portion 13b, from turning and moving from a prescribed direction (such as the conveyance-direction front side (arrow D1) of the mold set 10).

Also, according to the first embodiment, the conveyance robot 6 moves the mold set 10 to the stages 2 through 4 without changing the turning direction of the mold set 10. This makes it possible to keep the thick portion 13b-1, which is an example of the heat insulation portion of the outer layer portion 13b, in a prescribed direction (such as the conveyance-direction front side (arrow D1) of the mold set 10).

Also, the first embodiment uses, as an example of the heat insulation portion, the thick portion 13b-1 of the outer layer portion 13b, which is a portion having a great thickness in the radial direction of the sleeve 13. This can simplify the configuration of the mold set 10.

Also, according to the first embodiment, a portion made of a material different from that of the sleeve 13 may be used as an example of the heat insulation portion. In such a case, a heat insulation portion can be formed even when the thickness is not changed.

Also, according to the first embodiment, the stages 2 through 4 have the upper plates 2a through 4a and the lower plates 2b through 4b as an example of paired temperature adjustment members that face each other with the mold set 10 between them. Also, the plate temperature control unit (an example of the temperature control unit) 7 controls the temperatures of the upper plates 2a through 4a and the lower plates 2b through 4b so that the temperature distribution in the shaping-target material 200 is reduced, as shown in for example FIG. 4A. This can further suppress temperature distributions in the shaping-target materials 200.

Second Embodiment

The second embodiment is similar to the first embodiment except that an outer layer portion 23b is different from the outer layer portion 13b of the first embodiment, and accordingly explanations will only be given for points that differ.

Figure 7:
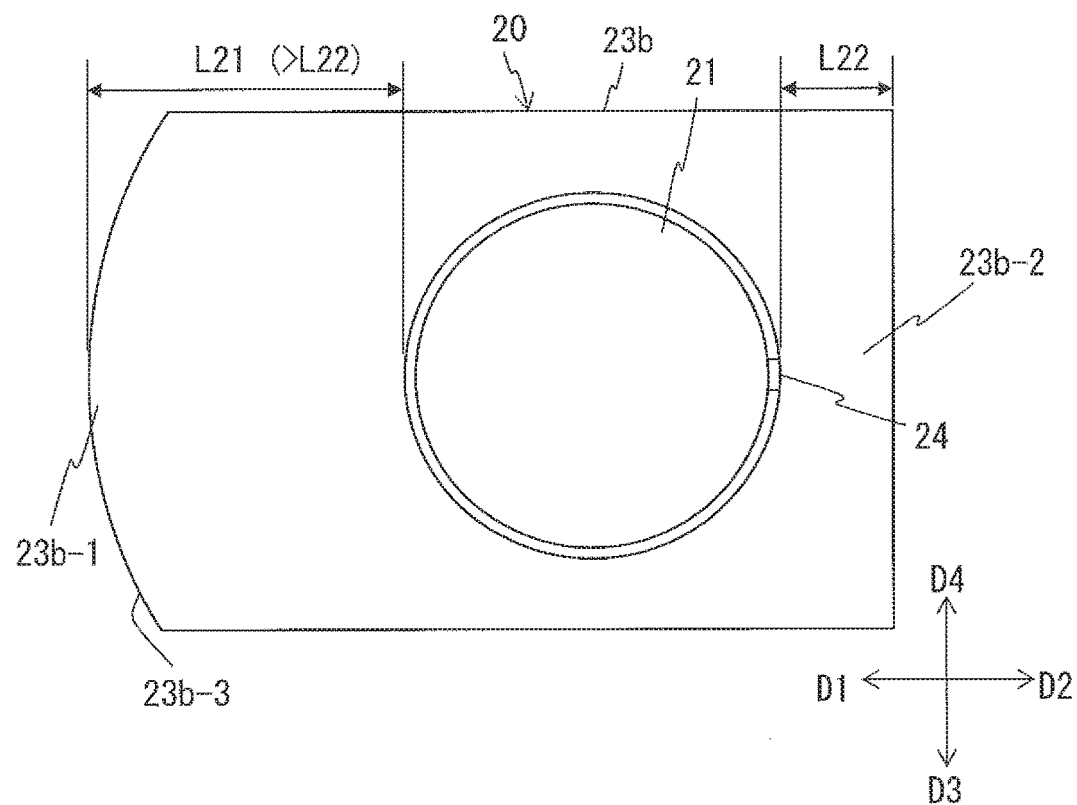
FIG. 7 is a plan view showing a mold set according to a second embodiment of the present invention.

FIG. 7 is a plan view showing a mold set 20 according to a second embodiment.

As shown in FIG. 7, the outer layer portion 23b has a substantially rectangular-tubular shape that is long in the arrangement directions (arrows D1 and D2) of the stages seen as a planar view. On the conveyance-direction front side (arrow D1) of the mold set 20 in the arrangement directions (arrows D1 and D2) of the stage of the outer layer portion 23b, a curved surface portion 23b-3 is formed in a projecting manner. Note that the outer layer portion 23b can be formed by cutting out three surfaces from a member in for example a tubular shape in such a manner that the curved surface portion 23b-3 remains.

Also, while the conveyance-direction front side (arrow D1) of the outer layer portion 23b is the thick portion 23b-1 (thickness is L21), the conveyance-direction rear side (arrow D2) is a thin portion 23b-2 (thickness is L22 (<L21)). Thereby, the thick portion 23b-1 has a heat insulation property that is higher than that of the thin portion 23b-2 so as to function as an example of the heat insulation portion.

Also according to the second embodiment, highly accurate optical elements are manufactured with suppressed temperature distributions in the shaping-target materials 200 by using the above configuration.

Third Embodiment

A third embodiment is also similar to the first embodiment except that an outer layer portion 33b is different from the outer layer portion 13b of the first embodiment, and explanations will only be given for points that differ.

Figure 8:
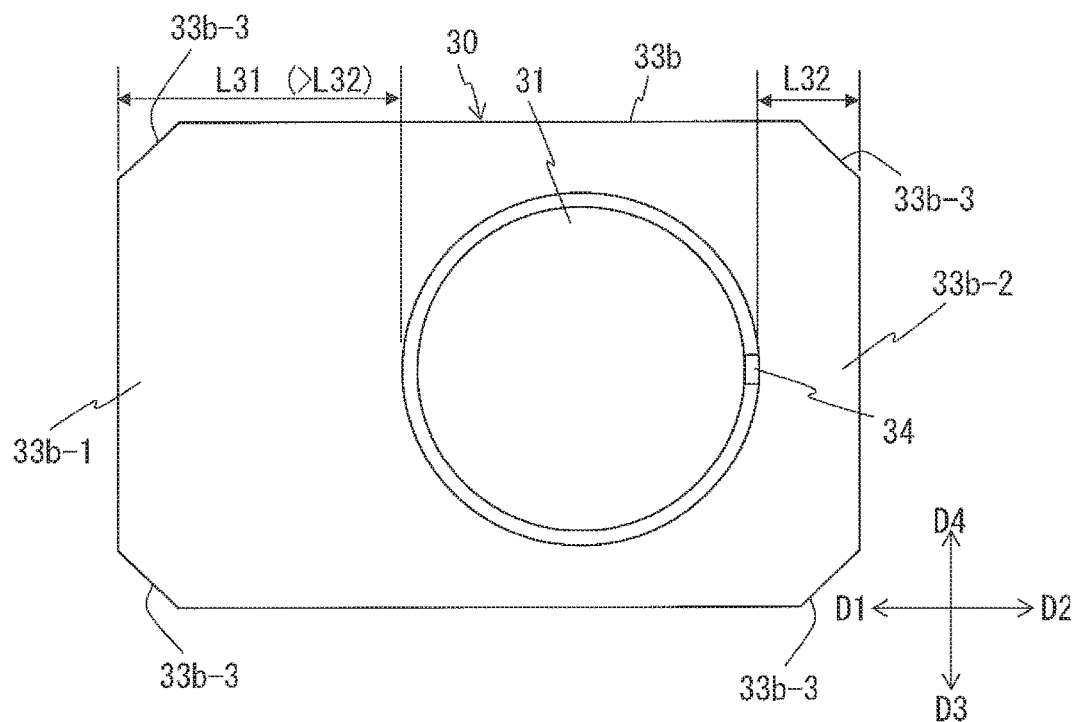
FIG. 8 is a plan view showing a mold set according to a third embodiment of the present invention.

FIG. 8 is a plan view showing a mold set according to the third embodiment.

As shown in FIG. 8, the outer layer portion 33b has a substantially rectangular-tubular shape that is long in the arrangement directions (arrows D1 and D2) of the stages seen as a planar view. Chamfered portions 33b-3 are formed at the four corners of the outer layer portion 33b seen as a planar view. Note that because the outer layer portion 33b has a substantially rectangular-tubular shape seen as a planar view, it is easier for the conveyance robot 6 shown in FIG. 1 to hold the mold set 10 and to adjust the orientation of the mold set 10.

Also, in the outer layer portion 33b, the conveyance-direction front side (arrow D1) is a thick portion 33b-1 (thickness is L31), while the conveyance-direction rear side (arrow D2) is a thin portion 33b-2 (thickness is L32 (<L31)). Thereby, the thick portion 33b-1 has a heat insulation property that is higher than that of the thin portion 33b-2 so as to function as an example of the heat insulation portion.

Also according to the third embodiment, highly accurate optical elements are manufactured with suppressed temperature distributions in the shaping-target materials 200 by using the above configuration.

Fourth Embodiment

A fourth embodiment is also similar to the first embodiment except that an outer layer portion 43b is different from the outer layer portion 13b of the first embodiment, and explanations will only be given for points that differ.

Figure 9B:
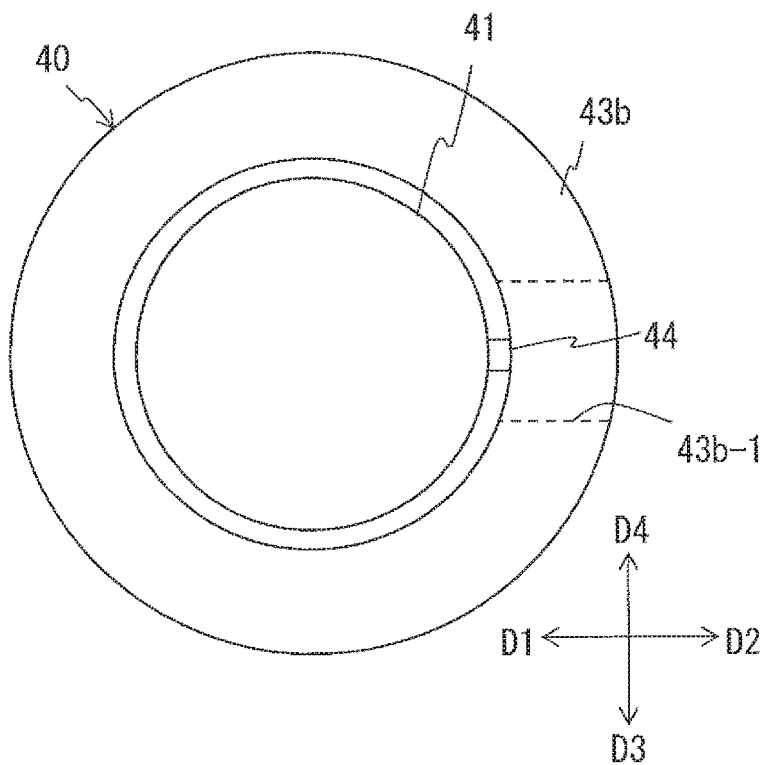
FIG. 9B is a plan view showing a mold set according to the fourth embodiment of the present invention.

FIG. 9A and FIG. 9B are a sectional view and a plan view of a mold set 40 according to the fourth embodiment.

FIG. 9C is a sectional view along line A-A in FIG. 9A.

As shown in FIG. 9A through FIG. 9C, the outer layer portion 43b of a sleeve 43 has a through hole 43b-1 formed on for example the conveyance-direction rear side (arrow D2) of the mold set 40, the through hole 43b-1 piercing the sleeve in the radial directions. A portion not having this through hole 43b-1 formed on it (such as other portions in the circumferential directions of the outer layer portion 43b) functions as an example of the heat insulation portion.

Accordingly, on the conveyance-direction front side (arrow D1) and both sides (an example of at least one of them) of the horizontal directions (arrows D3 and D4), which is orthogonal to the arrangement directions (arrows D1 and D2), the outer layer portion 43b has a heat insulation property that is higher than that on the conveyance-direction rear side (arrow D2)

Note that an example of the position of the through hole 43b-1 is the middle along the height direction; however, it may be formed at other positions including the upper or lower end. Also, the number of the through holes 43b-1 is not limited to one, and a plurality of through holes with a small diameter may be formed.

Also according to the fourth embodiment, highly accurate optical elements are manufactured with suppressed temperature distributions in the shaping-target materials 200 by using the above simple configuration so as to suppress an influence, of a reduction in the temperature, on the shaping-target material 200 on the conveyance-direction front side (arrow D1), which is influenced by temperature changes more easily. Also, according to the fourth embodiment, it is possible to suppress an influence, of a reduction in the temperature, on the shaping-target material 200 even in the horizontal directions (arrows D3 and D4), which are orthogonal to the arrangement directions (arrows D1 and D2) of the stages, i.e., even in the directions in which no stages are arranged and the ambient temperature becomes lower.

Fifth Embodiment

The fifth embodiment is similar to the first embodiment except that an outer layer portion 53b is different from the outer layer portion 13b of the first embodiment, and accordingly explanations will only be given for points that differ.

Figure 10:
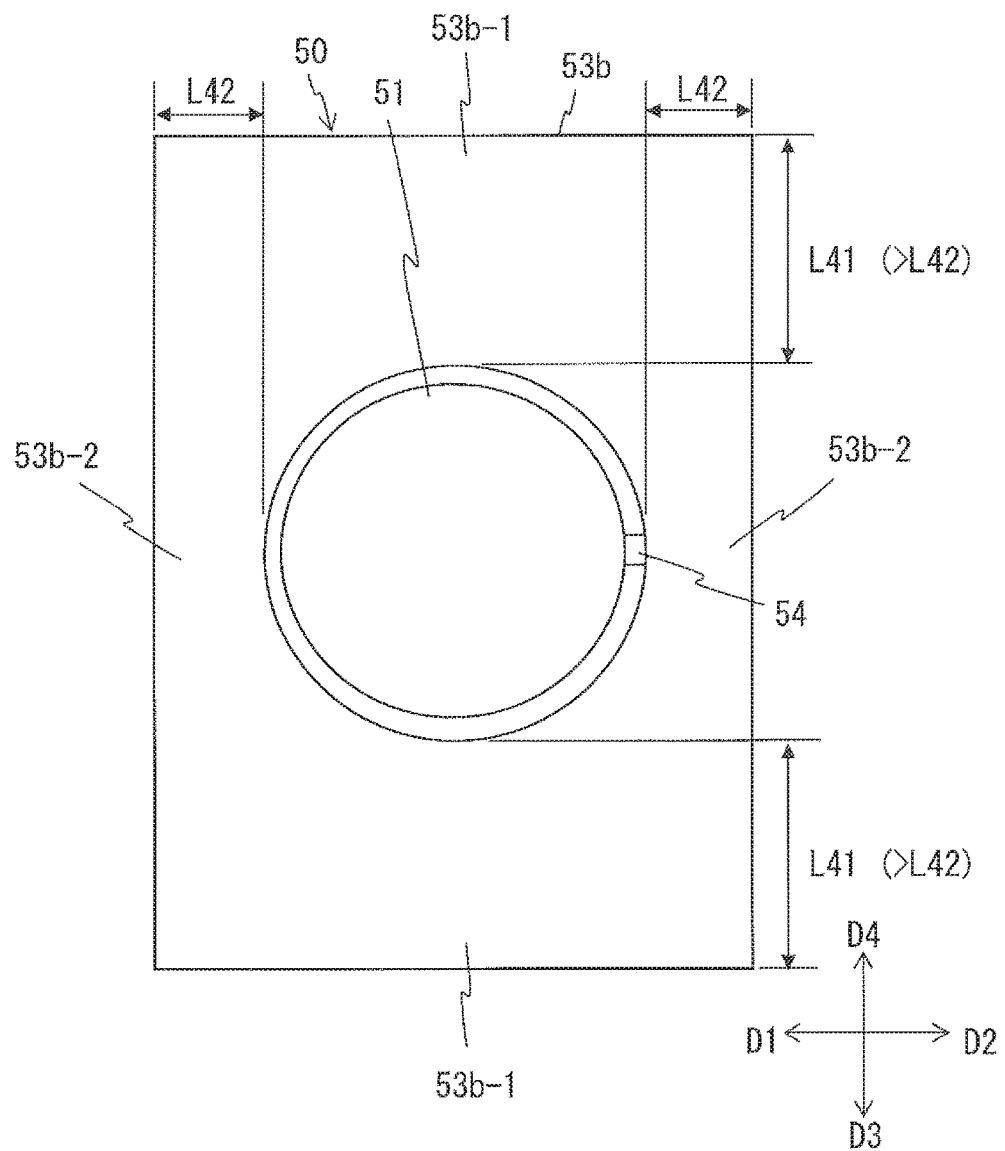
FIG. 10 is a plan view showing a mold set according to a fifth embodiment of the present invention.

FIG. 10 is a plan view of a mold set 50 according to the fifth embodiment.

As shown in FIG. 10, the outer layer portion 53b has a rectangular-tubular shape that is long in the horizontal directions (arrows D3 and D4), which are orthogonal to the arrangement directions of the stages (arrows D1 and D2) seen as a planar view. Also, while the sides of the above horizontal directions (arrows D3 and D4) of the outer layer portion 53b are a thick portion 53b-1 (thickness is L41), the sides of the conveyance directions (arrows D1 and D2) are a thin portion 53b-2 (thickness is L42 (<L41)).

Thereby, the thick portion 53b-1 has a heat insulation property that is higher than that of the thin portion 53b-2 so as to function as an example of the first heat insulation portion and the second heat insulation portion that face each other with an upper mold 51 and a lower mold (not shown in FIG. 10) between them. Note that while the first heat insulation portion and the second heat insulation portion (the thick portion 53b-1) have the same heat insulation property in the tenth embodiment, they may have different heat insulation properties.

Also according to the fifth embodiment, similarly to the fourth embodiment, highly accurate optical elements are manufactured with suppressed temperature distributions in the shaping-target materials 200 by using the above simple configuration so as to suppress an influence, of a reduction in the temperature, on the shaping-target material 200 in the horizontal directions (arrows D3 and D4), which are orthogonal to the arrangement directions (arrows D1 and D2) of the stages, i.e., in the directions in which no stages are arranged and the ambient temperature becomes lower.

Sixth Embodiment

The sixth embodiment is similar to the first embodiment except that an outer layer portion 63b is different from the outer layer portion 13b of the first embodiment, and accordingly explanations will be given only for points that differ.

Figure 11:
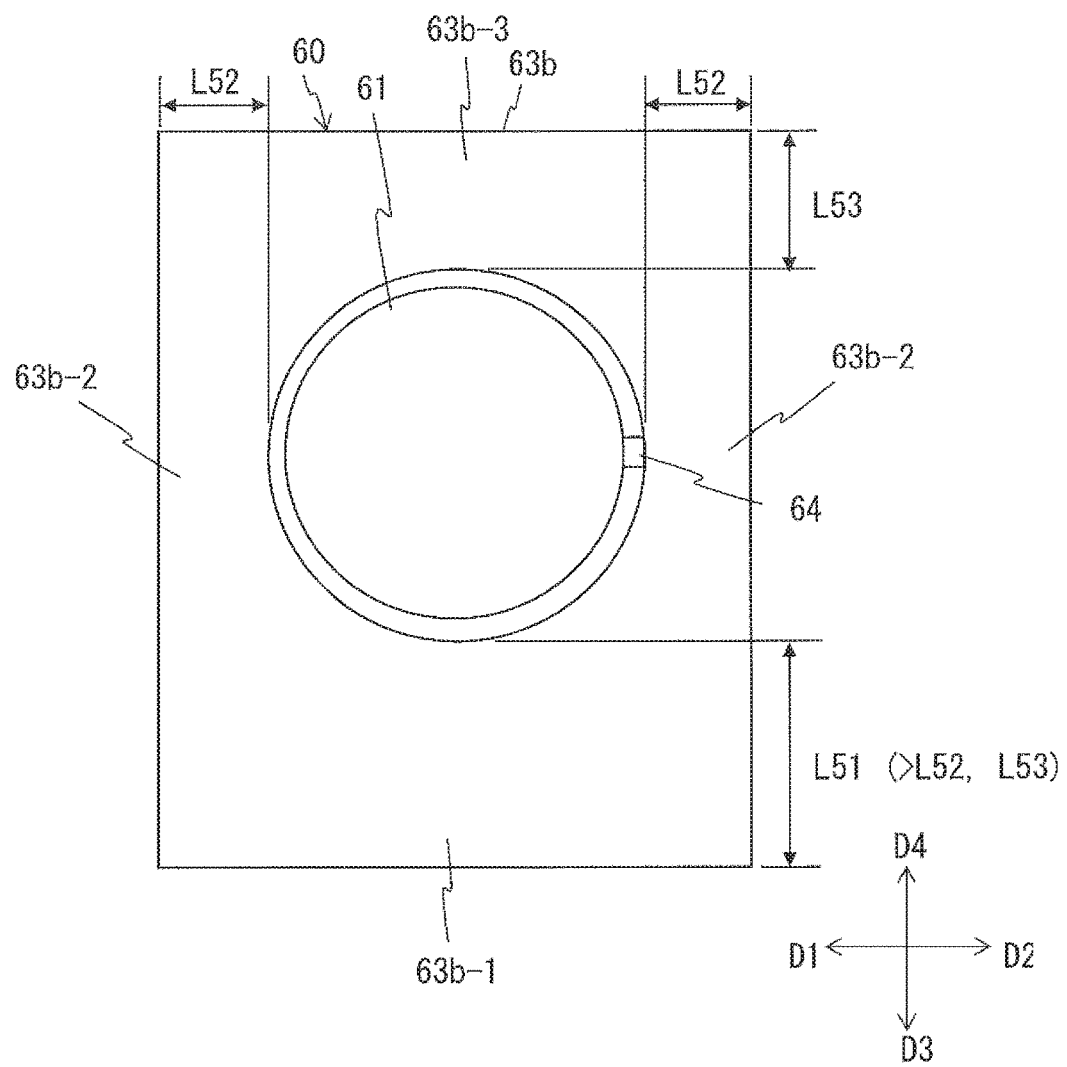
FIG. 11 is a plan view showing a mold set according to a sixth embodiment of the present invention.

FIG. 11 is a plan view of a mold set 60 according to the sixth embodiment.

As shown in FIG. 11, the outer layer portion 63b has a rectangular-tubular shape that is long in horizontal directions (arrows D3 and D4), which are orthogonal to the arrangement directions of the stages (arrows D1 and D2) seen as a planar view. Also, while the side of one of the above horizontal directions (arrow D3) of the outer layer portion 63b is a thick portion 63b-1 (thickness is L51), the side of the other of the above horizontal directions (arrow D4) and the sides of the arrangement directions (arrows D1 and D2) are thin portions 63b-2 and 63b-3 (thicknesses are L52 and L53 (<L51)). Thereby, the thick portion 63b-1 has a heat insulation property that is higher than that of the thin portion 63b-2 and of the thin portion 63b-3 so as to function as an example of the heat insulation portion.

According to the sixth embodiment, highly accurate optical elements are manufactured with suppressed temperature distributions in the shaping-target materials 200 by using the above simple configuration so as to suppress an influence, of a reduction in the temperature, on the shaping-target material 200 on one of the horizontal directions (arrow D3), which is orthogonal to the arrangement directions (arrows D1 and D2) of the stages, i.e., in the directions in which no stages are arranged and the ambient temperature becomes lower.

Seventh Embodiment

The seventh embodiment is similar to the first embodiment except that an outer layer portion 73b is different from the outer layer portion 13b of the first embodiment, and accordingly explanations will be given only for points that differ.

FIG. 12A and FIG. 12B are a sectional view and a plan view of a mold set 70 according to the seventh embodiment.

As shown in FIG. 12A and FIG. 12B, the outer layer portion 73b of a sleeve 73 has through holes 73b-1 and 73b-2 formed in for example both of the arrangement directions of the stages (arrow D1 and D2), the through holes 73b-1 and 73b-2 piercing in the radial directions. A portion not having the through hole 73b-1 or 73b-2 formed in it (such as other portions in the circumferential directions of the outer layer portion 73b) functions as an example of the heat insulation portion.

Thereby, the outer layer portion 73b has a heat insulation property that is higher than that on the arrangement direction (arrows D1 and D2) sides in both of the horizontal directions (arrows D3 and D4), which is orthogonal to the arrangement directions (arrows D1 and D2).

Note that an example of the positions of the through holes 73b-1 and 73b-2 is the middle along the height direction; however, they may be formed at other positions including the upper or lower end. The number of the through holes 73b-1 and 73b-2 is not limited to two, and a plurality of through holes with a small diameter may be formed in each of the arrangement directions (arrows D1 and D2).

According to the seventh embodiment, highly accurate optical elements are manufactured with suppressed temperature distributions in the shaping-target materials 200 by using the above simple configuration so as to suppress an influence, of a reduction in the temperature, on the shaping-target material 200 in the horizontal directions (arrows D3 and D4), which are orthogonal to the arrangement directions (arrows D1 and D2) of the stages, i.e., in the directions in which no stages are arranged and the ambient temperature becomes lower.

Eighth Embodiment

An eighth embodiment is similar to the first embodiment as well except that an outer layer portion 83b is different from the outer layer portion 13b of the first embodiment, and accordingly explanations will be given only for points that differ.

Figure 13:
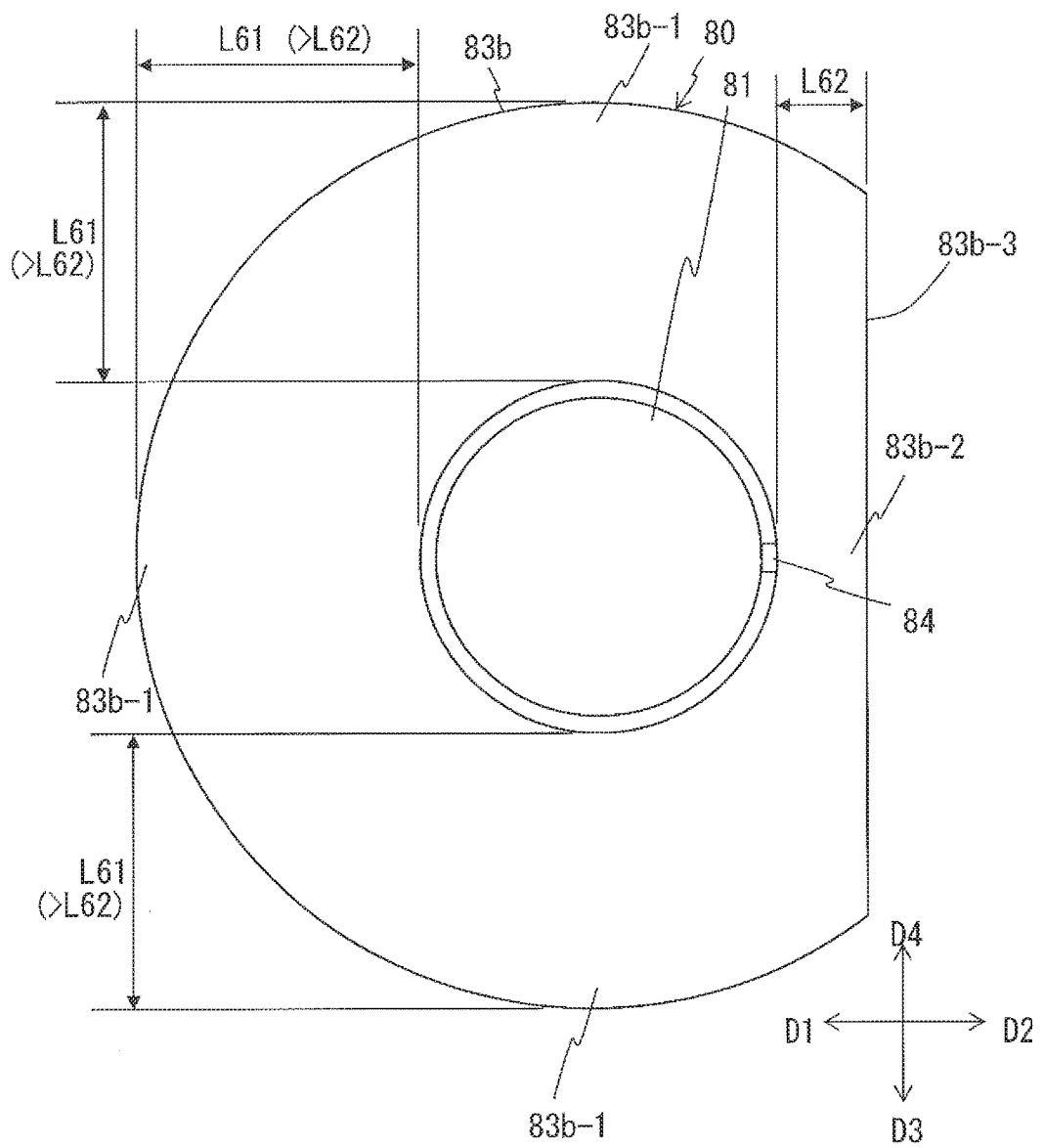
FIG. 13 is a plan view showing a mold set according to an eighth embodiment of the present invention.

FIG. 13 is a plan view of a mold set 80 according to the eighth embodiment.

As shown in FIG. 13, the outer layer portion 83b has a substantially cylindrical shape seen in a planar. However, on the conveyance-direction rear side (arrow D2) of the mold set 80, a flat portion 83b-3 is formed that expands in the horizontal directions (arrows D3 and D4), which are orthogonal to the arrangement directions (arrows D1 and D2), and in the vertical directions.

Accordingly, while the conveyance-direction front side (arrow D1) of the mold set 80 and the sides of both of the horizontal directions (arrows D3 and D4), which are orthogonal to the arrangement directions (arrows D1 and D2) of the stages, are a thick portion 83b-1 (thickness is L61), the conveyance-direction rear side (arrow D2) is a thin portion 83b-2 (thickness is L62 (<L61)).

Thereby, the thick portion 83b-1 has a heat insulation property that is higher than that of the thin portion 83b-2 so as to function as an example of a heat insulation portion. Also, the thick portion 83b-1 on the sides of both of the horizontal directions (arrows D3 and D4) functions as examples of the first and second heat insulation portions that face each other with an upper mold 81 and a lower mold (not shown in FIG. 13) between them.

According to the eighth embodiment, highly accurate optical elements are manufactured with suppressed temperature distributions in the shaping-target materials 200 by using the above simple configuration so as to suppress an influence, of a reduction in the temperature, on the shaping-target material 200 on the conveyance-direction front side (arrow D1), which is influenced by temperature changes more easily and on the sides of the horizontal directions (arrows D3 and D4), which are orthogonal to the arrangement directions (arrows D1 and D2) of the stages.

Ninth Embodiment

A ninth embodiment is similar to the first embodiment as well except that an outer layer portion 93b is different from the outer layer portion 13b of the first embodiment, and accordingly explanations will be given only for points that differ.

Figure 14:
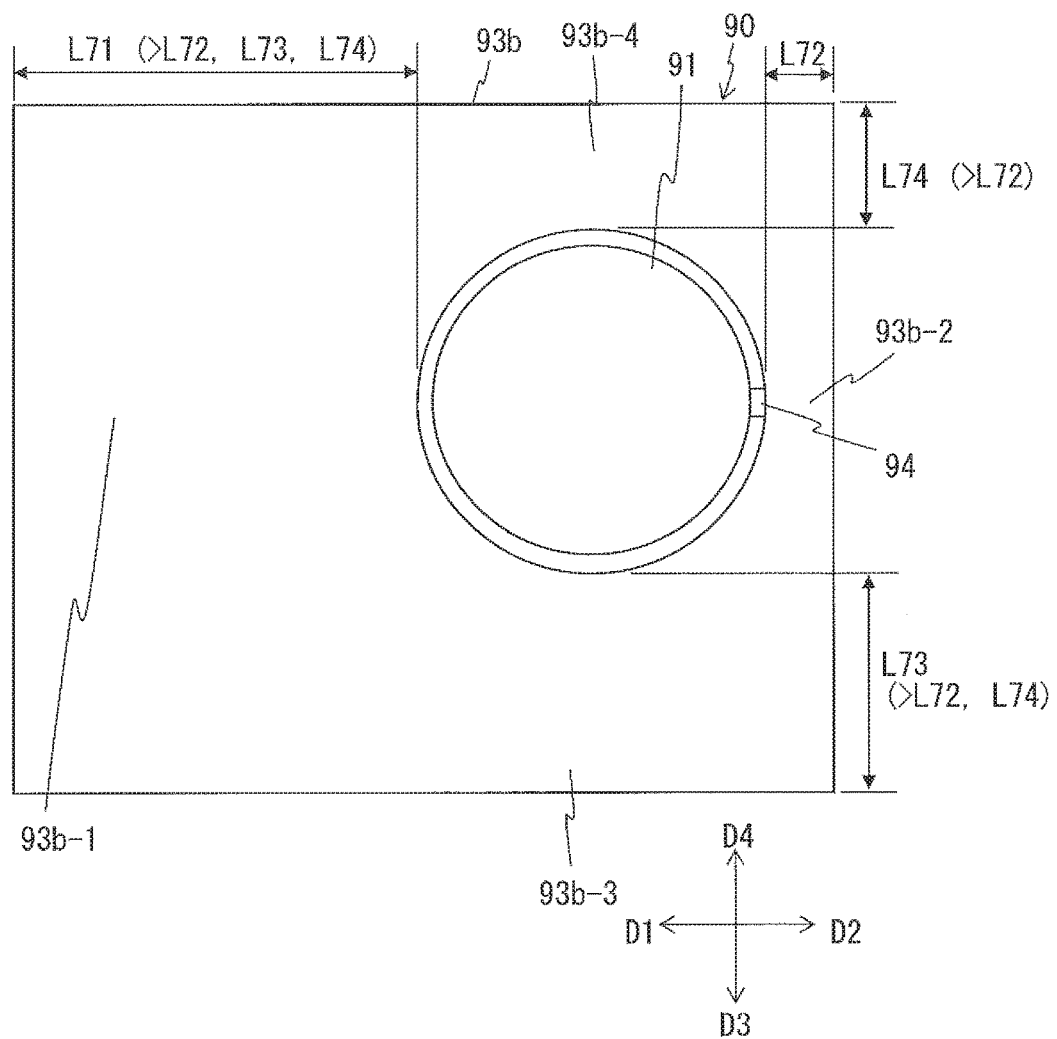
FIG. 14 is a plan view showing a mold set according to a ninth embodiment of the present invention.

FIG. 14 is a plan view of a mold set 90 according to the ninth embodiment.

As shown in FIG. 14, the outer layer portion 93b has a rectangular-tubular shape that is long in the arrangement directions (arrows D1 and D2) of the stages seen as a planar view. Also, while the conveyance-direction front side (arrow D1) of the mold set 90 is the thick portion 93b-1 (thickness is L71), the conveyance-direction rear side (arrow D2) is a thin portion 93b-2 (thickness is L72 (<L71)).

Also, the sides of the horizontal directions (arrows D3 and D4) of the outer layer portion 93b, which is orthogonal to the arrangement directions of the stages (arrows D1 and D2), are intermediate thickness portions 93b-3 and 93b-4 (L73 and L74 (<L71 and >L72)), which are thinner than the thick portion 93b-1 and thicker than thin portion 93b-2.

Thereby, the thick portion 93b-1 has a heat insulation property that is higher than that of the thin portion 93b-2 and the intermediate thickness portions 93b-3 and 93b-4 so as to function as an example of the heat insulation portion. Note that thickness L73 of the intermediate thickness portion 93b-3, which is one of the two intermediate thickness portions, is thicker than L74, which is the thickness of the other of the intermediate thickness portions. This makes the intermediate thickness portions 93b-3 and 93b-4 function as an example of the first and second heat insulation portions that face each other with an upper mold 91 and a lower mold (not shown in FIG. 14) between them. Also, the intermediate thickness portions 93b-3 and 93b-4 can be considered to be the first and second heat insulation portions having different heat insulation properties.

According to the ninth embodiment, highly accurate optical elements are manufactured with suppressed temperature distributions in the shaping-target materials 200 by using the above simple configuration so as to suppress an influence, of a reduction in the temperature and to some extent, on the shaping-target material 200 on the conveyance-direction front side (arrow D1), which is influenced by temperature changes (mainly, a reduction in temperatures) more easily and on the sides of the horizontal directions (arrows D3 and D4), which are influenced by temperature changes (mainly, a reduction in temperatures).

Tenth Embodiment

A tenth embodiment is also similar to the first embodiment except that an outer layer portion 103b is different from the outer layer portion 13b of the first embodiment, and explanations will only be given for points that differ.

Figure 15:
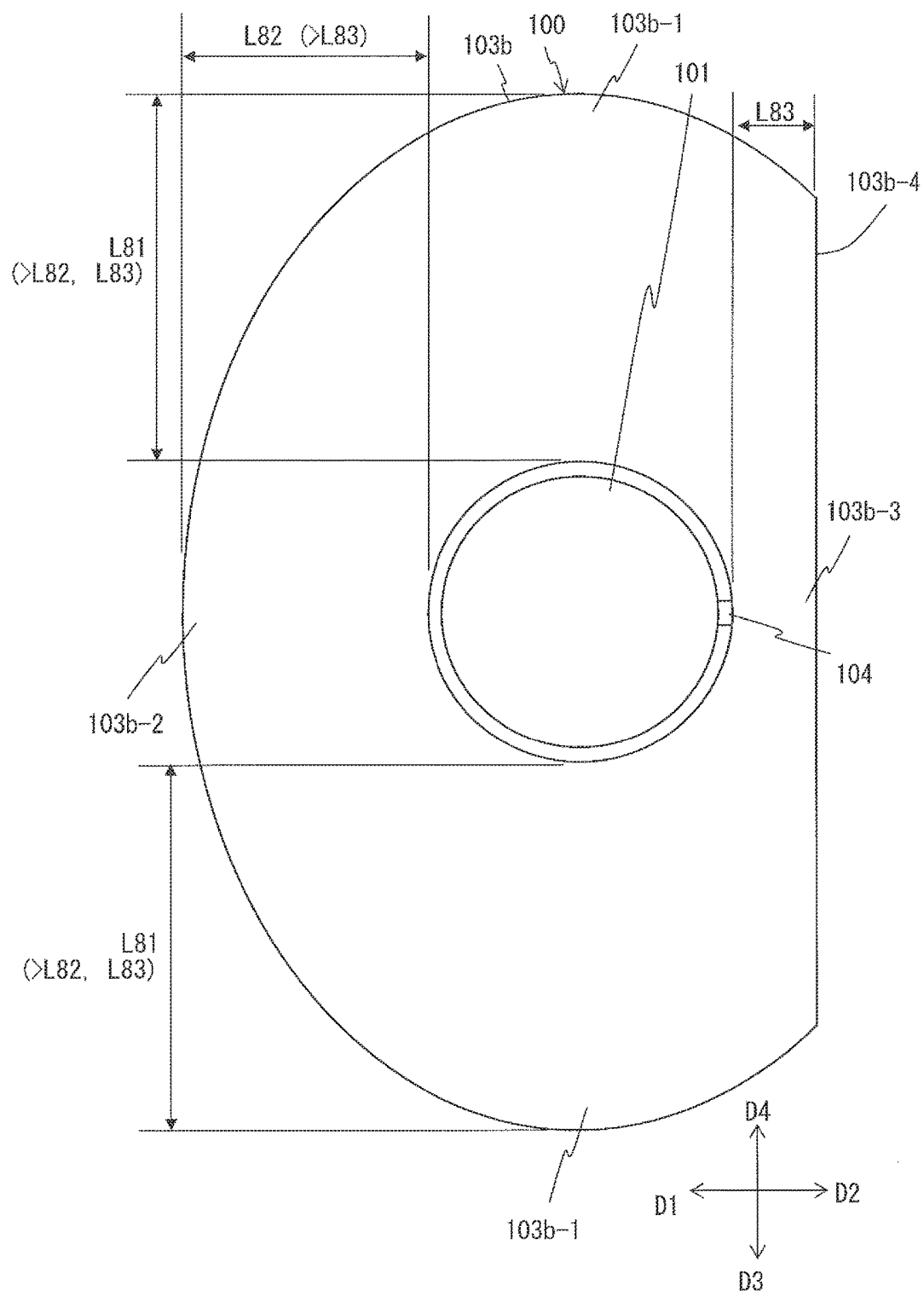
FIG. 15 is a plan view showing a mold set according to a tenth embodiment of the present invention.
Figure 16:
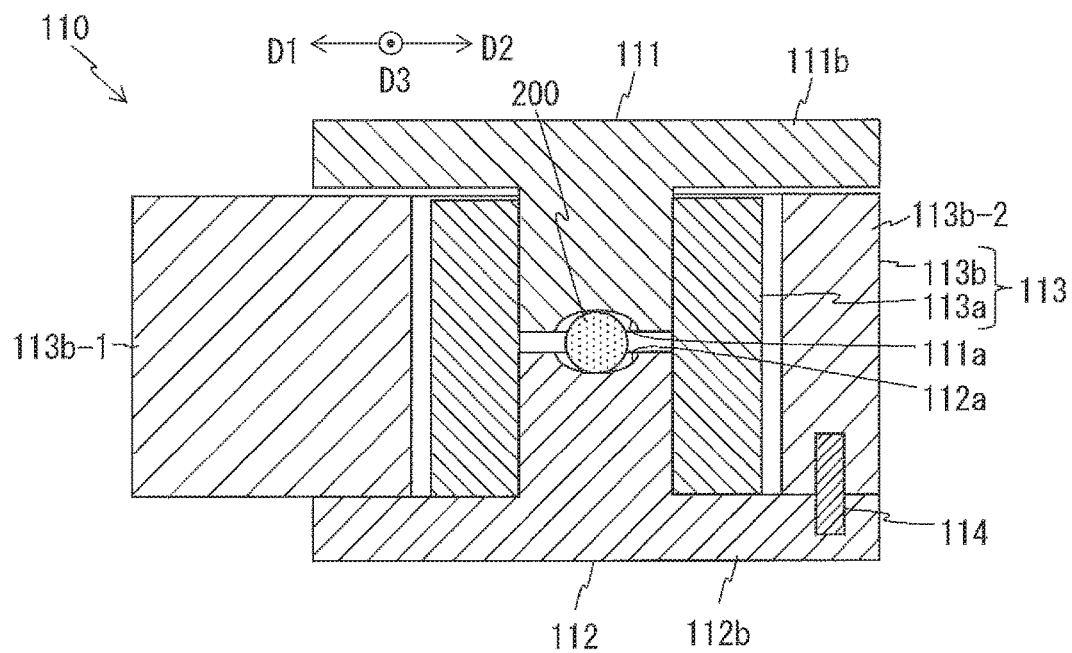
FIG. 16 is a sectional view showing a mold set according to an eleventh embodiment of the present invention.

FIG. 15 is a plan view showing a mold set 100 according to the tenth embodiment.

As shown in FIG. 15, the outer layer portion 103b has a substantially elliptic-cylindrical shape that is long in the horizontal directions, which are orthogonal to the arrangement directions of the stages (arrows D1 and D2) seen as a planar view. However, on the conveyance-direction rear side (arrow D2) of the mold set 100, a flat portion 103b-4 is formed that extends in the horizontal directions (arrows D3 and D4), which are orthogonal to the arrangement directions (arrows D1 and D2), and in the vertical directions.

Accordingly, the sides of the horizontal directions (arrows D3 and D4) of the outer layer portion 103b are a thick portion 103b-1 (thickness is L81), the conveyance-direction front side (arrow D1) is an intermediate thickness portion 103b-2 (thickness is L82 (<L81)), and the conveyance-direction rear side (arrow D2) is a thin portion 103b-3 (thicknesses are L83 (<L82)). Thereby, the thick portion 103b-1 has a heat insulation property that is higher than that of the intermediate thickness portion 103b-2 and the thin portion 103b-3 so as to function as an example of the first and second heat insulation portions that face each other with an upper mold 101 and a lower mold (not shown in FIG. 15) between them and that have the same heat insulation property.

According to the tenth embodiment, highly accurate optical elements are manufactured with suppressed temperature distributions in the shaping-target materials 200 by using the above simple configuration so as to suppress an influence, of a reduction in the temperature and to some extent, on the shaping-target material 200 on the conveyance-direction front side (arrow D1), which is influenced by temperature changes (mainly, a reduction in temperatures) more easily, and on the sides of the horizontal directions (arrows D3 and D4), which are influenced by temperature changes (mainly, a reduction in temperatures).

Eleventh Embodiment

The eleventh embodiment is similar to the first embodiment except mainly for a pin 114 and the configurations related to this pin 114, and accordingly explanations will only be given for points that differ.

Flanges 111b and 112b of upper and lower molds 111 and 112 have diameters greater than those of the flanges 11b and 12b of the first embodiment and portions of not only the sleeve main body 113a but also of the outer layer portion 113b are located between the flanges 111b and 112b.

Also, instead of being provided to project from the outer periphery of the flange 112b of the lower mold 112 as shown in FIG. 2A, the pin 114 is provided to project upward from the flange 112b of the lower mold 112 and is inserted into the outer layer portion 113b from the bottom surface side.

The above configuration realizes a situation of the eleventh embodiment in which the outer layer portion 113b does not abut the upper plates 2a through 4a or the lower plates 2b through 4b of the stages 2 through 4 shown in FIG. 1 and thereby prevents an influence of thermal conduction from the lower plates 2b through 4b. Because of this, highly accurate optical elements are manufactured with temperature distributions in the shaping-target material 200 more greatly suppressed.

Twelfth Embodiment

The twelfth embodiment is similar to the first embodiment except for the orientation of the thick portion 13b-1 of the outer layer portion 13b, and accordingly explanations will only be given for points that differ.

Figure 17:
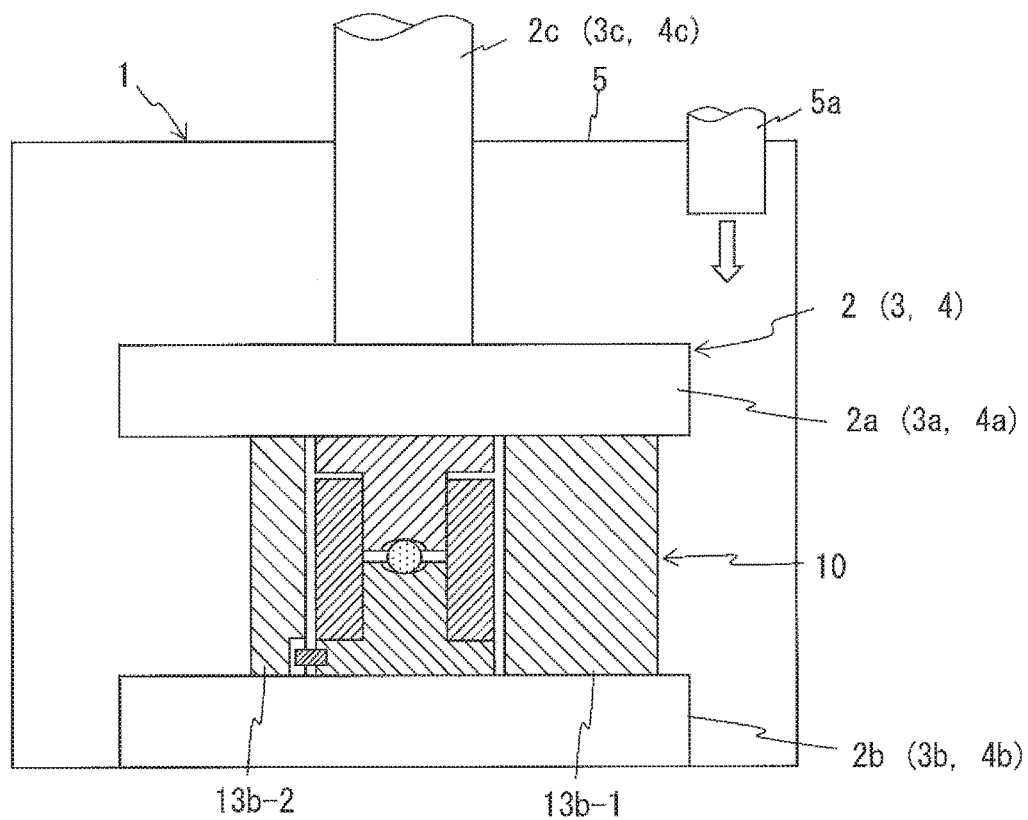
FIG. 17 is a side view showing an internal structure of an optical element manufacturing device according to a twelfth embodiment of the present invention.

FIG. 17 is a side view showing an internal configuration of the optical element manufacturing device 1 according to the twelfth embodiment.

As shown in FIG. 17, the shaping chamber 5 has a gas intake 5a through which a substitution gas flows into the shaping chamber 5, an example of the substitution gas being an inert gas (such as an Ar gas etc.) or a Nitrogen gas (such as $N_2$). The sleeve 13 is conveyed to the stages 2 through 4 in such a manner that a side of the gas intake 5a in circumferential directions of the sleeve 13 has a thick portion (an example of a heat insulation portion) 13b-1 with a heat insulation property that is higher than that on a side of at least part of other portions in order to reduce a temperature distribution in the shaping-target material 200.

According to the twelfth embodiment, highly accurate optical elements are manufactured with suppressed temperature distributions in the shaping-target materials 200 by using the above simple configuration so as to suppress an influence, of a reduction in the temperature, on the shaping-target material 200 on the side of the gas intake 5a that is influenced by temperature changes (mainly, a reduction in temperatures) more easily.

The invention claimed is:

1. An optical element manufacturing device comprising:
a mold set including a first shaping mold and a second shaping mold facing each other with a shaping-target material between the first and second shaping molds, and a sleeve located around the first and second shaping molds; and
a plurality of stages on which the mold set is conveyed and which heat, press or cool the shaping-target material, wherein
the sleeve is conveyed to the stages in such a manner that a conveyance-direction front side of the mold set in an arrangement direction of the plurality of stages has a heat insulation portion with a heat insulation property that is higher than that on a conveyance-direction rear side of the mold set in order to reduce a temperature distribution in the shaping-target material.

2. An optical element manufacturing device comprising:
a mold set including a first shaping mold and a second shaping mold facing each other with a shaping-target material between the first and second shaping molds, and a sleeve located around the first and second shaping molds; and
a plurality of stages on which the mold set is conveyed and which heat, press or cool the shaping-target material, wherein
the sleeve is conveyed to the stages in such a manner that at least one of horizontal directions, which are orthogonal to arrangement directions of the plurality of stages, has a heat insulation portion with a heat insulation property that is higher than that on a conveyance-direction rear side of the mold set in the arrangement directions in order to reduce a temperature distribution in the shaping-target material.

3. The optical element manufacturing device according to claim 2, wherein
the heat insulation portion includes a first heat insulation portion formed in one of horizontal directions, which is orthogonal to the arrangement directions, and a second heat insulation portion formed in the other of the horizontal directions.

4. The optical element manufacturing device according to claim 3, wherein
the first and second heat insulation portions have a same heat insulation property or different heat insulation properties.

5. An optical element manufacturing device comprising:
a mold set including a first shaping mold and a second shaping mold facing each other with a shaping-target material between the first and second shaping molds, and a sleeve located around the first and second shaping molds; and
a shaping chamber in which a gas intake is formed through which a substitution gas flows into the shaping chamber, wherein
the sleeve is conveyed to the stages in such a manner that a side of the gas intake in circumferential directions of the sleeve has a heat insulation portion with a heat insulation property that is higher than a side of at least part of other portions in order to reduce a temperature distribution in the shaping-target material.

6. The optical element manufacturing device according to claim 1, wherein
the sleeve has a sleeve main body, and an outer layer portion located on a portion further out than the sleeve main body, and
the heat insulation portion is formed on the outer layer portion.

7. The optical element manufacturing device according to claim 6, wherein
the mold set further includes a turning prevention member that prevents the outer layer portion from turning in the mold set.

8. The optical element manufacturing device according to claim 1, further comprising
a conveyance robot that conveys the mold set to the stages, wherein
the conveyance robot conveys the mold set without changing a turning direction of the mold set.

9. The optical element manufacturing device according to claim 1, wherein
the heat insulation portion has a portion that is thick in radial directions of the sleeve.

10. The optical element manufacturing device according to claim 1, wherein
a through hole that pierces the sleeve in radial directions is formed in the sleeve, and
the heat insulation portion is a portion in which the though hole is not formed.

11. The optical element manufacturing device according to claim 1, wherein
the heat insulation portion is a portion made of a material that is different from that of the sleeve.

12. The optical element manufacturing device according to claim 1, wherein
the stage has a pair of temperature adjustment members facing each other with the mold set between the temperature adjustment members,
the optical element manufacturing device further includes a temperature control unit that controls temperatures of the temperature adjustment members, and
the temperature control unit controls temperatures of the temperature adjustment members in order to reduce a temperature distribution in the shaping-target material.

* * * * *